United States Patent
Nakamura et al.

(10) Patent No.: US 6,433,848 B1
(45) Date of Patent: Aug. 13, 2002

(54) REFLECTION TYPE LIQUID CRYSTAL DISPLAY DEVICE AND DISPLAY APPARATUS THEREWITH

(75) Inventors: Hiroki Nakamura, Kanagawa-Ken; Masato Kemmochi, Saitama-ken; Yoshitaka Yamada, Hyogo-ken; Yoshihiro Watanabe, Kanagawa-Ken; Michiya Kobayashi, Kanagawa-Ken; Nozomu Harada, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/520,886

(22) Filed: Apr. 5, 2000

Related U.S. Application Data

(60) Division of application No. 08/834,867, filed on Apr. 10, 1997, now Pat. No. 6,124,911, which is a continuation-in-part of application No. 08/487,441, filed on Jun. 7, 1995, now Pat. No. 5,694,189.

(30) Foreign Application Priority Data

Jul. 29, 1994 (JP) .............................................. 6-178535
Dec. 19, 1994 (JP) .............................................. 6-315060

(51) Int. Cl.$^7$ ...................... G02F 1/1333; G02F 1/1335
(52) U.S. Cl. ......................................... 349/113; 349/86
(58) Field of Search ................................ 349/139, 113, 349/86, 179

(56) References Cited

U.S. PATENT DOCUMENTS

| | | | |
|---|---|---|---|
| 4,066,337 A | 1/1978 | Kobale et al. | 349/192 |
| 4,431,272 A | 2/1984 | Yazawa et al. | 349/113 |
| 4,712,877 A | 12/1987 | Okada et al. | 349/85 |
| 4,904,060 A | 2/1990 | Grupp | 349/42 |
| 5,285,268 A | 2/1994 | Nakagaki et al. | 340/160 |
| 5,371,617 A | 12/1994 | Mitsutake et al. | 349/10 |
| 5,379,135 A | 1/1995 | Nakagaki et al. | 349/9 |
| 5,475,513 A | 12/1995 | Nakanishi et al. | 349/5 |
| 5,526,149 A | 6/1996 | Kanbe et al. | 349/113 |
| 5,724,111 A | 3/1998 | Mizobata et al. | 349/113 |

FOREIGN PATENT DOCUMENTS

| | | |
|---|---|---|
| JP | 4-147215 | 5/1992 |
| JP | 5-273404 | 10/1993 |
| JP | 6-194654 | 7/1994 |

*Primary Examiner*—Toan Ton
(74) *Attorney, Agent, or Firm*—Finnegan, Henderson, Farabow, Garrett & Dunner, L.L.P.

(57) ABSTRACT

A front surface of the opposite electrode of a liquid crystal display panel is formed in a curved shape. The relation between the reflecting surface of the pixel electrode and the curved surface of the opposite substrate is defined so that a leaving direction of the light that is reflected by the first face of the opposite substrate is different from a leaving direction of light that is emitted from the first face of the opposite substrate after having been reflected by the pixel electrodes through the liquid crystal layer. Thus, undesired light on the front surface of the opposite substrate is separated from light that is displayed. Consequently, an image free of dazzling and deterioration of contrast ratio due to undesired reflected light can be obtained with a high contrast ratio. In a display apparatus containing the reflection type liquid crystal display, an incident surface to a dichroic prism is an inclined surface including a curved surface, not a surface that is perpendicular to the optical axis. Thus, signal light that is reflected on each reflection type liquid crystal display panel and that is displayed can be separated from undesired light that is reflected on the surface of the dichroic prism. Thus, an image with a high quality, and a high contrast ratio can be displayed.

6 Claims, 23 Drawing Sheets

MINIMUM ANGLE NECESSARY FOR ELECTRODE
(IN ASSUMPTION THAT REFRACTIVE INDEX OF
LIQUID CRYSTAL IS 1.5

REFLECTION TYPE LIQUID CRYSTAL DISPLAY DEVICE AND DISPLAY APPARATUS THEREWITH

This is a division of application Ser. No. 08/834,867, filed Apr. 10, 1997, U.S. Pat. No. 6,124,911 which is a continuation-in-part of Ser. No. 08/487,441, filed Jun. 7, 1995, and issued as U.S. Pat. No. 5,694,189 on Dec. 2, 1997. The contents of these applications being relied upon and incorporated by reference herein.

BACKGROUND OF THE INVENTION

1. Field of the Invention

The present invention relates to a reflection type liquid crystal display device and a display apparatus therewith, in particular, to a reflection type liquid crystal display device and a display apparatus therewith having a high contrast ratio and a high display quality.

2. Description of the Related Art

In recent years, the number of pixels of liquid crystal display devices has been increased and in particular the size thereof have been reduced. For example, a fabrication of a liquid crystal display device with a 0.7 inch panel on which as many as 300,000 pixels are formed has been studied. To do that, in such a liquid crystal display device, thin film transistors (TFTS) composed of polysilicon should be formed on a peripheral portion of a substrate with display pixel electrodes and so forth. In addition, the aperture ratio of the pixel portion should be increased. When the pixel size of the liquid crystal display apparatus is reduced, the decrease of aperture ratio should be considered as an important problem.

In other words, in a conventional liquid crystal display device, light is entered from the opposite substrate. A liquid crystal layer is used as a light shutter. Light passes through the light shutter and is emitted from the array substrate (namely, the front surface of the panel). In this case, the aperture ratio of each pixel is at most 30 to 40 %. The rest (60 to 70 %) of the pixel is a light shielding layer that shields incident light.

If a switching device that turns on and off a pixel electrode is constructed of a TFT (thin film transistor) composed of for example amorphous silicon, when light strikes the TFT, leak current takes place due to an optical excitation effect. Thus, the operation characteristics of the switching device decrease. Alternatively, the switching device may malfunction. To prevent this problem, a light shielding film that shields the switching device from the light is required. When the light shielding region includes portions such as signal lines and scanning lines composed of metal materials, the region accounts for as many as 60 to 70 % of the effective display area.

Thus, as the pixel size decreases, the luminance of the display screen decreases and the contrast ratio degrades. Particularly, in a projection type liquid crystal display device, the contrast ratio of more than 100:1 is required. Thus, when the display area of the pixel becomes small, a more critical problem takes place. Consequently, for the liquid crystal display device with small pixels, the efficiency of the use of the incident light should be further improved.

As a means for solving this problem, the advantages of so-called reflection type display device that reflects the incident light on the pixel electrode and emits the light to the incident side are becoming attractive. The reflection type display device has been studied and developed as the liquid crystal display device that should have a higher pixel aperture ratio.

In the reflection type liquid crystal display device, various structural portions including switching devices, scanning lines, and signal lines are disposed below pixel electrodes. Light reflected on the pixel electrodes is displayed on a screen. Thus, the aperture ratio of the pixels of the reflection type liquid crystal display device is theoretically 100 % except dividing region of pixels. Although the aperture ratio depends on the panel size, so far it has been improved up to 85 %.

However, in the reflection type liquid crystal display device, light entered from the image display side is reflected on the pixel electrodes and displayed on the screen. Thus, in addition to the light that is reflected on the pixel electrodes, undesired light takes place on the front surface of a base member of the liquid crystal display panel. The undesired reflected light dazzles the display screen, thereby remarkably degrading the on/off ratio of the displayed image The theoretical reflectivity on a transparent base member of the opposite substrate is given by the following equation.

$$r^2 = \{(n1-n2)/(n1+n2)\}^2$$

where $r^2$ is the reflectivity on the base member; and n1 and n2 are the refractive indexes of a first medium and a second medium, respectively.

When light enters from air (refractive index n1 =1.0) to a transparent substrate such as a glass substrate (refractive index n2 =1.5), the reflectivity is about 4%.

Thus, even if the reflection efficiency of the reflection pixel electrodes is improved to 100% and the absorption loss of light in the liquid crystal layer and the optical path is zero, the on/off contrast ratio of the displayed image that is finally observed is 96 % 4 % =24:1. Consequently, the contrast is insufficient for both the projection type liquid crystal display device that requires an on/off contrast ratio of more than 100:1 and the direct view type liquid crystal display device.

As a means for preventing light from reflecting on the interface in between different materials in the display device, a reflection protecting film may be coated on the liquid crystal display panel. However, the effect of such a reflection protecting film is limited to a region of a particular wavelength. In addition, since the fabrication of the liquid crystal display panel becomes complicated, the cost thereof increases.

In addition, even if such a reflection protecting film is used, as shown in a curve of contrast ratio v.s. aperture ratio of FIG. 18, undesired reflected light cannot be suppressed enough. Thus, the above-mentioned high contrast ratio of 100:1 cannot be actually accomplished.

For example, in a three-panel type liquid crystal projector, liquid crystal display panels are directly contacted with a dichroic prism. Alternatively, the panels are adhered to the dichroic prism with an adhesive region with almost the same refractive index as that of a glass substrate. In such a manner, the amount of reflected light can be halved.

However, a incident light in the dichroic prism is reflected on the front surface of the dichroic prism. The reflected light is emitted from the dichroic prism along with signal light reflected from the panels. The resultant light is projected to the screen through a projection lens system. Thus, the contrast ratio remarkably deteriorates due to the undesired reflected light, thereby adversely dazzling the screen.

The present invention is made to solve such problems. An object of the present invention is to provide a reflection type liquid crystal projector having a reflection type liquid crystal display device that separates light for image display from light that is simply reflected on the surface of crystal display panel and prevents a contrast ratio from deteriorating due to reflected light so as to display an image with a high contrast ratio.

SUMMARY OF THE INVENTION

According to the present invention, each pixel electrode is disposed with an inclination angle to a base member (for example, glass substrate) on the front surface side of a liquid crystal display panel (namely, on an opposite substrate side). In addition, the front surface of the opposite substrate is disposed with an inclination angle to a base member (for example, glass substrate) of a liquid crystal display panel (namely, on an array substrate side).

The front surface of the opposite electrode can be a curved shape having a inclination angle being changed continuously. The curved shape includes a convex curved shape and a concave curved shape. Those area on the front surface of the opposite electrode where the curved shape is formed, are faced with a pixel electrode, a plurality of the pixel electrodes adjacent, or a part of the pixel electrode.

The relation between the reflecting surface of the pixel electrode and the main surface of the base member of the liquid crystal display panel is defined so that the difference between the reflecting angle of light that is entered as light of a light source and reflected on the front surface of the base member and the leaving angle of the light emitted as light that is displayed through a liquid crystal display panel is equal to or greater than the collection angle of the display device optics. Thus, the undesired reflected light on the main surface of the base member of the display is separated from the light that is displayed. Thus, since the dazzling of the display screen due to the undesired reflected light and the deterioration of the contrast ratio are prevented, an image with a high contrast ratio can be accomplished.

Inclination of the front surface of the opposite substrate is not restricted being formed of a linear surface but also being formed of a curved surface having a distribution of inclination angle. The curved first surface (the front surface) of the opposite substrate separates light so that a leaving direction of the light that is reflected by the first surface of the opposite substrate is different from a leaving direction that is emitted from the first surface of the opposite substrate after having been reflected by the pixel electrodes through the liquid crystal layer. Those aspect of the invention can be applicable to a projection type display apparatus having the liquid crystal display apparatus employes a light separating means such as the curved surface.

In the liquid crystal projector according to the present invention, the incident plane to a dichroic prism is inclined to the optical axis (not perpendicular thereto). Thus, signal light that is reflected on each reflection type liquid crystal display panel can be separated from undesired light that is reflected on the surface of dichroic prism. Consequently, an image with a high contrast ratio can be displayed.

In particular, since a reflection type liquid crystal display device applying a polymer dispersed liquid crystal layer has twice as long an optical path as that of a transparent type liquid crystal display device, a cell thickness for obtaining the desired contrast ratio can be reduced. In addition, such advantages as to reduce both the driving voltage and the response time are accompanied.

Accordingly, a projection type display apparatus applying a reflection type liquid crystal display device can make a collecting angle of the schlieren optical system larger than a projection type display apparatus with a transparent type liquid crystal display device, realizing a bright display while keeping a high contrast ratio.

Furthermore, the present invention eliminates the reflecting light on the surface of a liquid crystal display panel or the surface of a dichroic prism, thereby realizing a display further excellent in display quality with a higher contrast ratio.

An inclination angle of the incident plane of the dichroic prism to the optical axis and a relative inclination angle of each pixel electrode to the base member on the front surface side (namely, on an opposite substrate side) are preferably in the range from 1 to 10 degrees. The inclination angle is more preferably in the range from 2 to 5 degrees. When the inclination angle is larger than the conventional angle (ranging from 5 to 15 degrees), the difference of the thicknesses of the dichroic prism or the opposite substrate becomes too large. Alternatively, it becomes difficult to control the variation of the cell gap in the liquid crystal display panel. So, due to the collection angle, the contrast ratio is remarkably varied in polymer dispersed liquid crystal display device. In addition, uneven display takes place due to the difference of cell gap. Experimental results conducted by the inventors of the present invention show that when the inclination angle is not in the range of the preferable angles, the resultant liquid crystal display device may not be practically used.

In a reflection type liquid crystal display device that is a related art reference disclosed as Japanese Patent Laid-Open Publication No. 4-147215, light from a light source is linearly polarized by a polarizing beam splitter. In addition, light that is reflected on a polarizing converting plane is vertically entered into the liquid crystal display device. And light that is reflected by the liquid crystal display device and rotates a direction of polarization is guided to the polarizing beam splitter. And then, the reflected light is transmitted through the polarizing beam splitter and projected as an enlarged image. In this related art reference, to prevent the contrast ratio from decreasing due to the mixture of the reflected light on the main surface of the opposite substrate of the liquid crystal display device with the light that is displayed, the opposite substrate is formed in a wedge shape with an inclination angle ranging from 5 to 15 degrees. Thus, the light reflected at the interface of the opposite substrate is prevented from being entered into the polarizing beam splitter. To do that, the distance between the reflection type liquid crystal display device and the polarizing beam splitter should be increased. Alternatively, the inclination angle should be increased. The former has a disadvantage in which the size of the optical system becomes larger. On the other hand, the latter has disadvantages in which the thickness of one edge of the substrate is much larger than that of the other edge. In addition, when liquid crystal cells are fabricated, they are pressured in upper and lower directions. Thus, it is very difficult to control (or prevent) the variation of the thickness of cells in a liquid crystal display panel. In an optical system of the related art reference, since the collection angle of the light of the light source is not controlled, the collection angle of the incident light of the optical system that uses a conventional light source and a conventional reflector is around 14 degrees or greater. Actually, in the art reference, the polarization direction of light reflected on the front surface of the panel does not change. Thus the main light reflected on the front surface of the panel is vended to the light source by the polarizing beam splitter and not entered to the projection lens.

However, according to the present invention, both the collection angle on the light incident side and the collection angle on the light leaving side are predefined. Thus, even if the inclination angle that causes the reflection on the pixel electrodes to be separated from the reflection on the opposite substrate is small, the contrast ratio can be easily improved.

Consequently, the variation of the thickness of cells in a liquid crystal display panel can be prevented. In addition, the size of the optical system can be reduced.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Figure 1A:
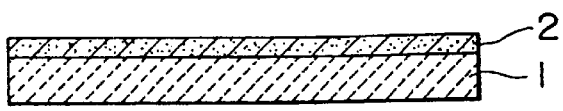
FIGS. 1A, FIG. 1B, FIG. 1C, FIG. 1D, FIG. 1E, and FIG. 1F are cross sectional views showing a fabrication process of principal structural portions of a reflection type liquid crystal display device according to a first embodiment of the present invention.
Figure 1B:
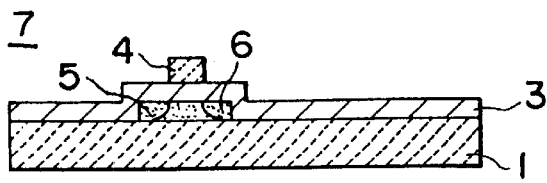
Figure 1C:
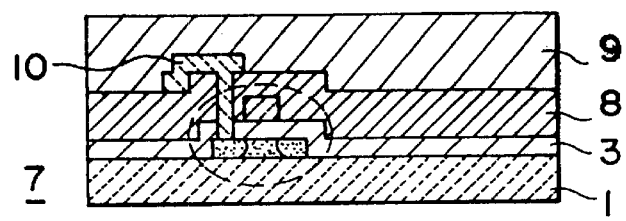
Figure 1D:
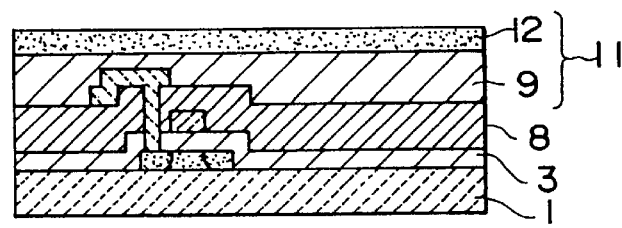
Figure 1E:
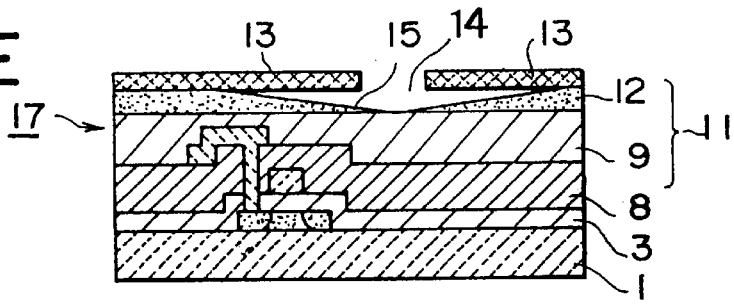
Figure 1F:
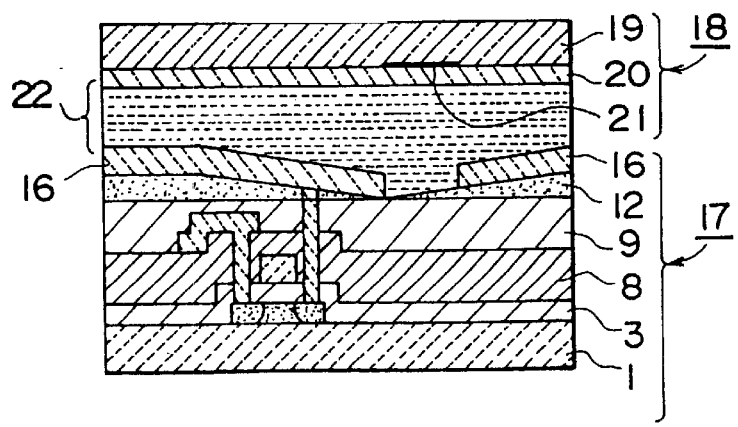

Next, with reference to the accompanying drawings, embodiments of reflection type liquid crystal display devices and display apparatus therewith according to the present invention will be described.

First Embodiment

A reflection type liquid crystal display device according to a first embodiment of the present invention has a pixel size of 100 $\mu$m and a diagonal length of approximately 3 inches.

FIGS. 1A to 1F are sectional views showing the structure of the reflection type liquid crystal device and a fabrication method thereof according to the first embodiment of the present invention.

A high heat resisting substrate 1 that has been rinsed is used as a substrate 1. TFTs are formed on the high heat resisting substrate 1 by a conventional method. It should be noted that the high heat resisting substrate 1 is not limited to a glass substrate. Instead, an insulating substrate composed of for example quartz, sapphire, SiC, ceramic or crystal silicon may be used. The TFT devices are formed in the following manner. After an amorphous silicon is formed, it is grown in solid phase by LPCVD method. As a result, a polysilicon layer 2 is formed. Thereafter, an island shaped pattern is left by dry etching method. A gate shielding film 3 and a gate electrode 4 are formed by CVD and sputter method. Impurity regions of a source region 5 and a drain region 6 are formed by ion implanting method. As a result, principal portions including an activation layer of the TFT 7 are formed (see FIG. 1B).

Thereafter, a first inter-layer shielding film 8, a signal line 10, a second inter-layer shielding film 9, and so forth are formed by the conventional forming method of TFT peripheral portions. As a result, the TFT 7 is formed as a pixel switching device (see FIG. 1C). In FIGS. 1A to 1F, a storage capacitance Cs is omitted. After the second inter-layer shielding film 9 is formed on the TFT 7, the second inter-layer shielding film 9 is smoothed by grinding method. An inclination layer 11 is formed by etching process so that the light reflecting surface of a pixel electrode that will be formed at a later fabrication step is inclined to a base member of an opposite substrate.

The inclination layer 11 can be formed in various manners. In this embodiment, plasma is radiated to the front surface of the second inter-layer shielding film 9, which has been smoothed, in a $CF_4$ gas atmosphere. As a result, a damage layer 12 is formed on the front surface of the second inter-layer shielding film 9 that is composed of SiO$_2$ (see FIG. 1D). Thereafter, a resist 13 is coated on the front surface of the resultant structure and then patterned so that an opening portion 14 corresponding to each pixel is formed (see FIG. 1E).

Thereafter, the resultant structure is soaked in a NH$_4$F solution and wet etched. At this point, the resultant structure is horizontally etched out (like "side-etched") so that the front surface 15 of the damage layer 12 below the resist 13 shown in FIG. 1E has an inclination. In other words, in this method, the front surface 15 of the damage layer 12 is more quickly etched out than the inside of the damage layer 12. Thus, the damage layer 12 is etched out with a taper angle. Experimental results conducted by the inventors of the present invention show that the inclination of the front surface of the damage layer 15 can be well formed at a taper angle in the range from 3 to 8 degrees. The taper angle may be formed by various other methods such as sol-gel method or dry etching method.

Thereafter, the resist 13 is peeled off. A second resist is coated on the resultant structure. An opening portion corresponding to each pixel electrode is patterned by RIE (Reactive Ion Etching) method. After the second resist is peeled off, an Al—Si layer with a thickness of 0.6 μm is formed on the front surface of the damage layer 15 that has been etched out with the above-described taper angle by sputter method. The material of the pixel electrode 16 may be another metal film with a higher reflectivity. In this embodiment, the Al—Si layer is formed in a high vacuum chamber by the sputter method. Thus, just after the metal film is formed, the reflectivity on the front surface of the pixel electrode 16 is approximately 90 %. When the reflectivity of the front surface of the pixel electrode 16 is lower than 90 %, the front surface of the pixel electrode 16 can be ground so as to improve the reflectivity. Thereafter, the pixel electrode 16 is patterned and thereby a TFT array substrate 17 is formed (see FIG. 1F).

On the other hand, an opposite substrate 18 is formed in the following manner. As a base member, a glass substrate 19 is made of a non-alkaline glass. On the glass substrate 19, an transparent electrode 20 composed of ITO and a light shielding film (black matrix) 21 composed of a light shielding material is formed. The light shielding film 21 may not be used for the reflection type liquid crystal display device. However, for example, the light shielding film 21 is used in space between adjacent pixels to insulate these pixels.

The peripheral portions of the opposite substrate 18 and the TFT array substrate 17 are sealed. And, these two substrates are disposed in opposite relation. A liquid crystal material is filled from a filling portion (not shown) to a gap formed between the opposite substrate 18 and the TFT array substrate 17. As a result, a liquid crystal layer 22 is formed. Thereafter, the filling portion is sealed.

The principal portions of the reflection type liquid crystal display device according to the first embodiment of the present invention are formed in the above-described manner.

In this embodiment, as the liquid crystal material of the liquid crystal layer, to verify the effects of the present invention, a liquid crystal that does not use a polarizing plate (namely PDLC: polymer dispersion liquid crystal) is used.

Figure 2:
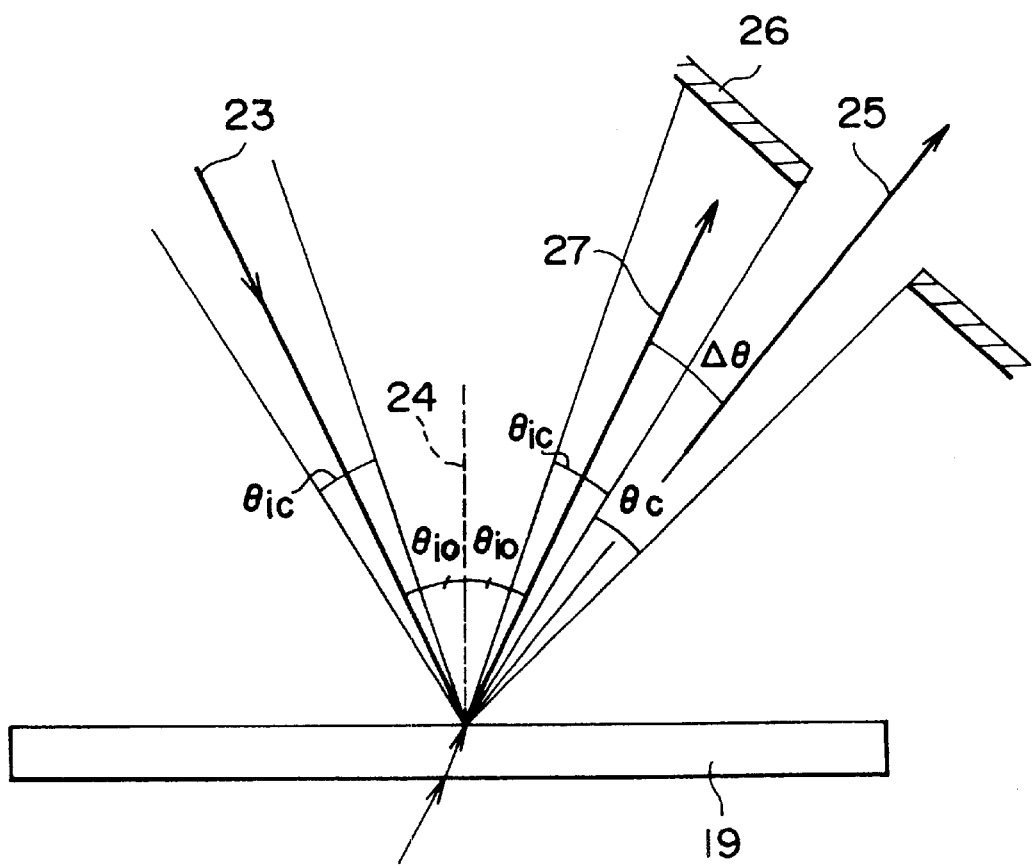
FIG. 2 is a schematic diagram for explaining the operation of a reflection type liquid crystal display device according to the present invention.

In this embodiment, an optical system as shown in FIG. 2 is used. In other words, incident light beam 23 is entered with an incident angle of 10 degrees to the normal direction of the glass substrate 19, which is a transparent base member of the opposite substrate 18. On the other hand, as shown in FIG. 2, light 25 that is projected to the outside of the glass substrate 19 through the pixel electrode 16, the liquid crystal layer 22, and so forth of the reflection type liquid crystal display apparatus (see FIG. 1) is separated from undesired reflected light 27 by a simple schlieren optical system that is an aperture 26 disposed at the exit of the leaving light so as to prevent the reflected light 27 from leaking out to the display side. The collection angle of the aperture 26 of the schlieren optical system is 8 degrees.

Experimental results show that the reflection type liquid crystal display device according to the first embodiment can display an image with a high contrast ratio and a high luminance. The inequality of electric field due to the inclination of the main surface of the pixel electrode 16 to the opposite electrode 20 and the liquid crystal layer 22 does not affect the display quality of the display image.

Next, in the reflection type liquid crystal display device according to the present invention, the operation of separating the undesired light that is reflected on the front surface of the base member from the light that is reflected on the front surface of the pixel electrode and that is displayed will be described.

Figure 3:
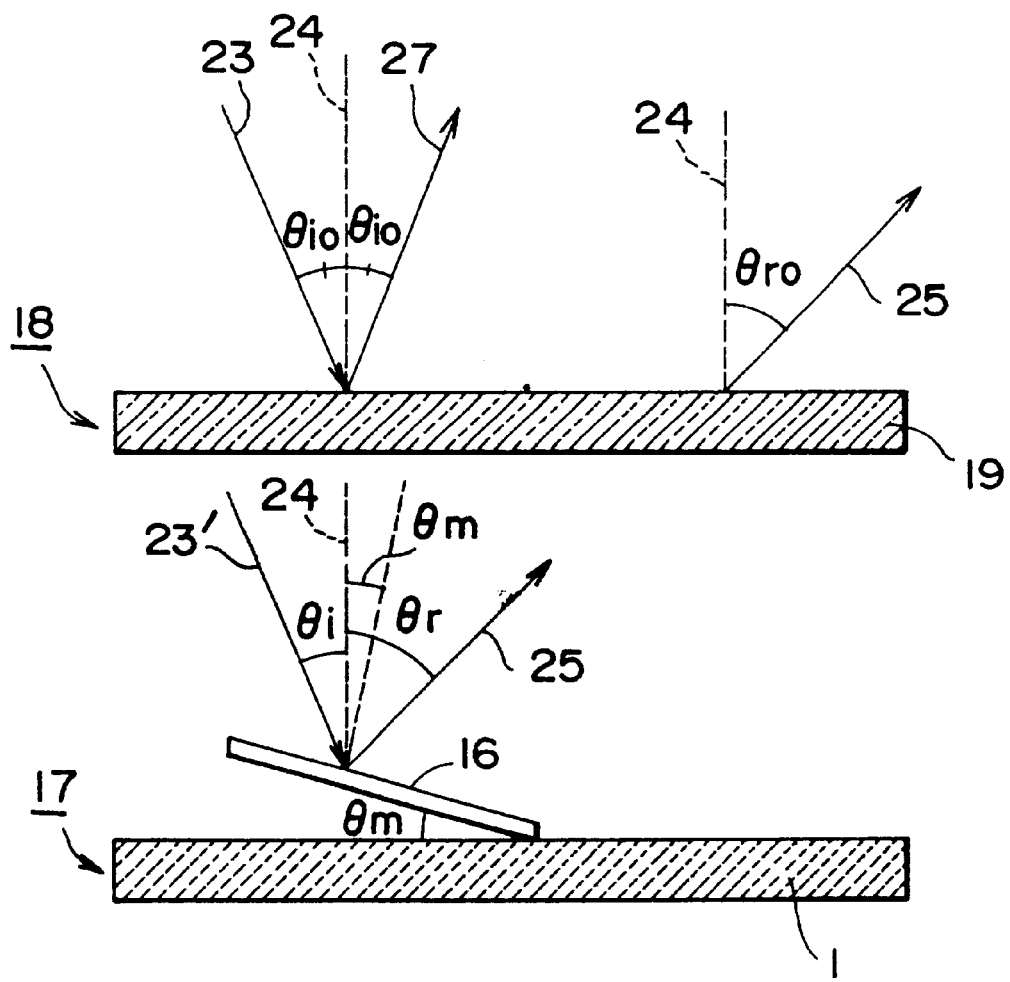
FIG. 3 is a schematic diagram for explaining the operation of a reflection type liquid crystal display device according to the present invention.

FIG. 3 is a sectional view for explaining the operation for separating two kinds of light described above. In FIG. 3, it is assumed that the base members of the substrates 17 and 18 are disposed in parallel with each other and in opposite relation. In addition, it is assumed that the incident light has a collection angle θic due to an incident light system. Now, the incident angle of the incident light to the front surface of the base member of the opposite substrate 18 is denoted by θi0 and the leaving angle θr0 of the leaving light that is reflected on the inclined reflecting main surface of the pixel electrode 16 and emitted from the front surface of the base member 19 of the opposite substrate 18. In addition, the inclination angle of the reflecting main surface of the pixel electrode 16 to the main surface of the base member 19 of the opposite substrate 18 is denoted by θm. Moreover, the angle between the normal 24 of the base member 19 of the opposite substrate 18 and the incident angle of the incident light on the inclined main surface of the pixel electrode 16 is denoted by θi. Thus, the angle θr between the normal 24 of the base member 19 of the opposite substrate 18 and the main surface of the pixel electrode 16 is given by the following equation.

$$\theta r = 2\theta m + \theta i$$

To separate the light 27 reflected on the front surface of the base member 19 of the opposite electrode 18 from the light 25 that is displayed, the difference of angles between the light 25 that is reflected on the main surface of the pixel electrode 16 and the light 27 that is reflected on the base member 19 of the opposite substrate 18 should be equal to or greater than the collection angle of the optical system.

Thus, the inclination angle θm of the inclined surface of the pixel electrode 16 should be designated so that the following expression is satisfied.

$$\theta c < \Delta\theta = |\theta r0 - \theta i0|$$

where Δθ is the difference of angles between the light 25 that is reflected on the main surface of the pixel electrode 16 and the light 27 that is reflected on the surface of the base member 19 of the opposite substrate 18; and θc is the collection angle of the optical system.

In other words, it is clear that the main surface of the pixel electrode 16 should be inclined to the base member 19 of the oposite substrate 18 so that the difference between incident angle θi0 (equal to the reflecting angle of the reflected light) of the incident light 23' to the main surface of the base member 19 of the opposite substrate 18 and the leaving angle θr0 of the light that is reflected on the inclined main surface of the pixel electrode and emitted from the base member 19 of the opposite substrate 18 is equal to or greater than the collection angle θc.

The spirit of the present invention is in that the opposite substrate 18 is inclined to the reflecting main surface of the pixel electrode 16. Thus, the pixel electrode 16 may be disposed in parallel with the main surface of the base member of the TFT array substrate 17. In this case, the main surface of the base member 19 of the opposite substrate 18 should be inclined to the main surfaces of the array substrate 17 and the pixel electrode 16. With this structure, the same effects of the present invention can be accomplished. An embodiment of this structure will be described later. Next, the outline of the operation according to the present invention will be described.

According to Snell's law, the following equations are satisfied.

$$n_{1c}\sin\theta r = \sin\theta r0$$

$$n_{1c}\sin\theta i = \sin\theta i0$$

where $n_a$ is the refractive index of air (=1); and $n_{1c}$ is the refractive index of liquid crystal.

When θi is removed from the above equations, the following equation can be obtained.

$$\theta r0 = \theta c + \theta i0$$

where θi0 is the incident angle (namely, the surface reflecting angle); θm is the inclination angle of the reflecting main surface of the pixel electrode 16; and θr0 is the reflecting angle of the pixel electrode 16. The minimum value of θm (Now, call it as "θmin") is obtained as follows. When θi0 <θr0, the following equation is obtained.

$$\theta r0 = \theta c + \theta i0$$

When θi is removed from the above equations, the minimum value θmin can be obtained as follows.

$$\theta\min = \{\arcsin(\sin(\theta c + \theta i0)/n_{1c}) - \arcsin(\sin(\theta i0)/n_{1c})\}/2$$

where θi0 is the incident angle (namely, the reflecting angle of the surface of the substrate); θm is the inclination angle of the reflecting main surface of the pixel electrode 16; θc is the collection angle; and $n_{1c}$ is the refractive index of the liquid crystal.

Figure 4:
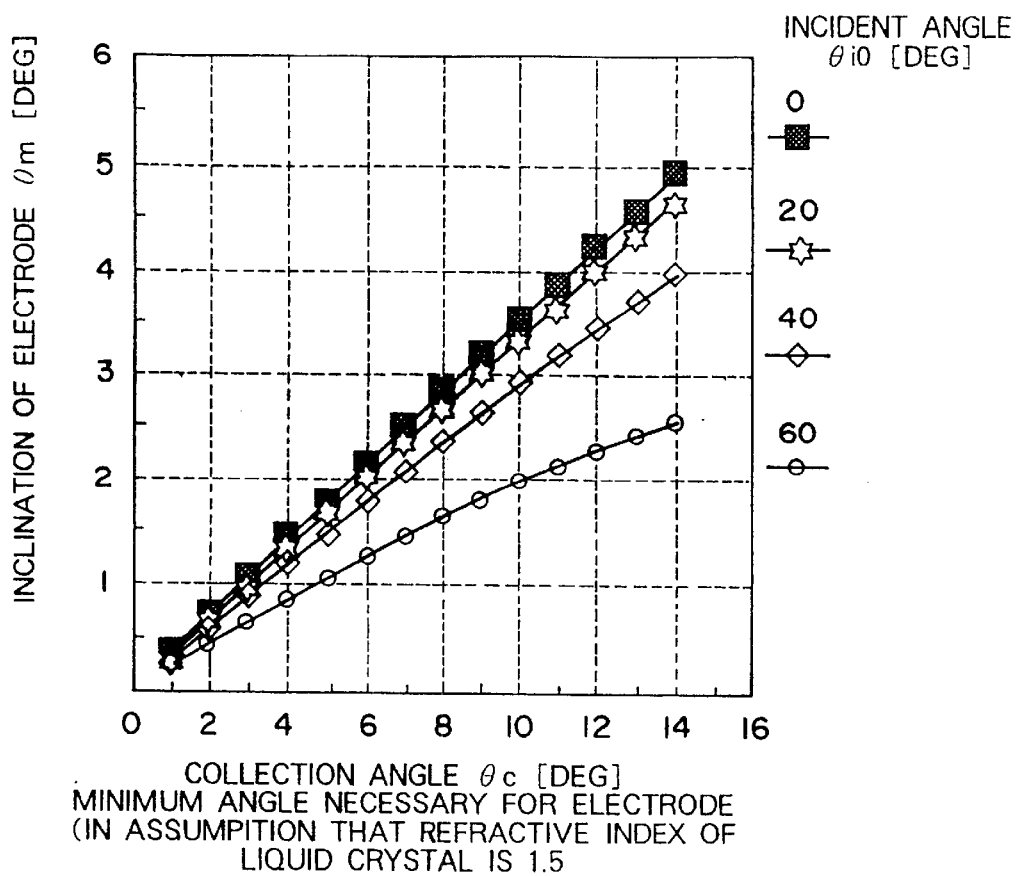
FIG. 4 is a graph showing the relation between an inclination angle of an electrode and a collection angle.

With this equation, when the refractive index of the liquid crystal layer 22 is for example 1.5, the results as shown in FIG. 4 are obtained. The inclination angle θmin of the main surface of the pixel electrode 16 necessary for separating the light 25 that is displayed from the undesired reflected light 27 can be calculated. For example, when the incident angle is 20 degrees, the collection angle of the incident light is 8 degrees, and the collection angle of the leaving light is 8 degrees, the required inclination angle of the pixel electrode 16 is 2.6 degrees. Thus, when the inclination angle of the pixel electrode 16 is equal to or greater than 2.6 degrees, it is clear from FIG. 4 that the light reflected on the substrate can be satisfactorily separated by the 2.6 degrees. The collection angle of the incident light is preferably equal to or smaller than the collection angle of the leaving light so as to have a proper contrast ratio.

Second Embodiment

Figure 5:
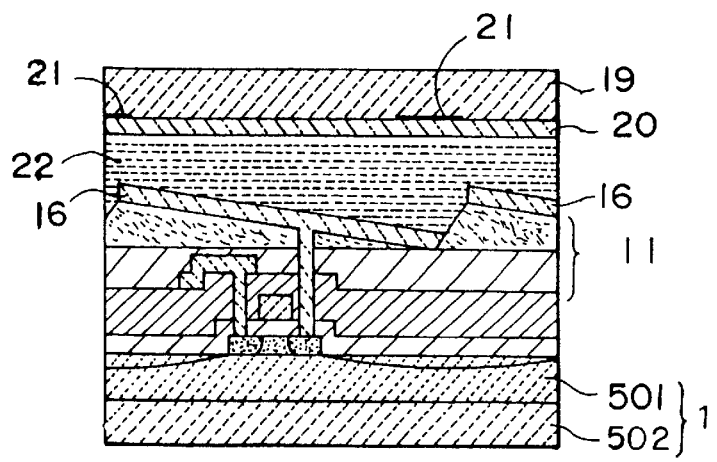
FIG. 5 is a cross sectional view showing the structure of a reflection type liquid crystal display device according to a second embodiment of the present invention.

A reflection type liquid crystal display device according to a second embodiment of the present invention has a pixel size of 100 μm and a diagonal length of approximately 3 inches. As shown in FIG. 5, in the reflection type liquid crystal displaying device according to the second embodiment, as with the first embodiment, the reflection main surface of the pixel electrode 16 is inclined to the base member 19 of the opposite substrate 18. In the first embodiment, part of the pixel electrode 16 is an inclined main surface. However, the rest is in parallel with the front surface of the base member 19 of the opposite substrate 18. Thus, the reflected light of the parallel portion becomes lost due to the undesired reflection of the incident light on the front surface of the base member 19 of the opposite substrate 19. Thus, the intensity of the leaving light 25 may decrease. To improve the efficiency of the use of the leaving light 25 that is displayed and prevent the contrast ratio from decreasing due to the reflected light on the front surface of the base member of the opposite substrate 18, in the second embodiment, the pixel electrode 16 is formed so that the entire reflecting surface becomes an inclined surface. In addition, a switching device and a peripheral drive circuit are formed on a crystal silicon substrate for using advantages of the reflection type liquid crystal display device. In other words, a switching device array substrate in which a crystal silicon substrate 501 is associated with a drive circuit is formed. (The switching device array substrate is hereinafter referred to as a TFT array substrate 17. Although a device formed on a crystal silicon substrate may not be strictly a TFT, it is conceptionally the same as the TFT as a switching device. For simplicity, such a term is used.) In the reflection type liquid crystal display device, the base member disposed below the pixel electrode 16 may be not transparent. Thus, a non-transparent crystal silicon substrate 501 may be used. Since the operational characteristics of the switching device are very good and the crystal silicon substrate 501 can be readily formed by conventional LSI fabrication technologies, the crystal silicon substrate 501 is suitable for a liquid crystal display device with precise pixels. A glass substrate 502 is adhered to the rear surface of the crystal silicon substrate 501 so as to improve the mechanical strength. As a result, the base member 1 of the TFT array substrate 17 is formed of the glass substrate 502 and the crystal silicon substrate 501.

Various structural portions such as signal lines, scanning lines, and so forth are formed by the conventional device forming process as with the first embodiment. The switching device is formed on the crystal silicon substrate by the conventional LSI fabrication technologies. The designed wire width of the switching device (so called "design rule") is 3 μm. Each device is isolated by LOCOS method. It should be noted that the switching device may be formed by depositing a crystal silicon on an insulating substrate as a material of the principal portions (for example, the activation layer) of the TFT as with the first embodiment.

In the second embodiment, the steps until the second inter-layer shielding film 9 is formed are the same as those in the first embodiment. Thereafter, the resist 13 is patterned. The second inter-layer shielding film 9 is etched out by inclined ion etching method so that almost the entire main surface of the pixel electrode formed on the second inter-layer shielding film 9 becomes an inclined surface. At that process, The ion etching operation is performed with a satisfactory power. It should be noted that an inter-layer shielding film may be selectively formed on Al signal lines before the etching process is performed. The taper angle of the inclined main surface of the pixel electrode 16 (namely, the angle to the opposite substrate 18 of the base member 19) is approximately 5 degrees.

Thereafter, an Al—Si film is formed by sputter method. The Al—Si film is patterned and thereby principal portions of the TFT array substrate 17 are formed. The pixel electrode 16 that is composed of a light reflecting material is patterned so that it fully extends and covers the signal lines. In other words, the pixel electrode 16 is used as a light shielding film of the switching device. The second inter-layer shielding film 9 is thickly formed between the pixel electrode 16 and the signal line 10. Thus, signal pulses do not interfere between the signal line 10 composed of aluminum and the pixel electrode 16.

Thus, the pixel electrode 16 that has an inclined surface on the entire front surface can separate the light reflected on the front surface of the base member 19 of the opposite substrate 18 from the light 25 that is displayed. Consequently, an image with a high luminance and a high contrast can be displayed. In addition, the pixel electrode 16 can satisfactorily work as the light shielding film, and the pixel electrode 16 can prevent the optical leak current in the switching device. Moreover, the display surface of the pixel electrode 16 can be effectively used. As a result, an image can be displayed with a high luminance, free of a malfunction of the switching device.

Third Embodiment

A third embodiment of the present invention is a reflection type liquid crystal display device with a pixel size of 100 $\mu$m and a diagonal length of approximately 3 inches. Since the reflecting main surface of the pixel electrode 16 according to the second embodiment of the present invention is inclined to the opposite electrode 20 of the opposite substrate 18. Thus, the distance between one edge of the inclined main surface of the pixel electrode 16 and the opposite electrode 20 is different from the distance between the other edge of the inclined main surface of the pixel electrode 16 and the opposite electrode 20. Thus, when the cell gap between the pixel electrode 16 and the opposite electrode 20 is large, the difference of the distances of the cell gap due to the inclination of the pixel electrode 16 can be ignored. In recent years, however, the requirement of reducing the lengths of the liquid crystal display devices is become strong. As the length of the cell gap is reduced, the difference of the distances of the cell gap due to the inclination of the pixel electrode 16 cannot be ignored. Thus, a variation of the display of each pixel takes place, thereby deteriorating the image quality.

Figure 6:
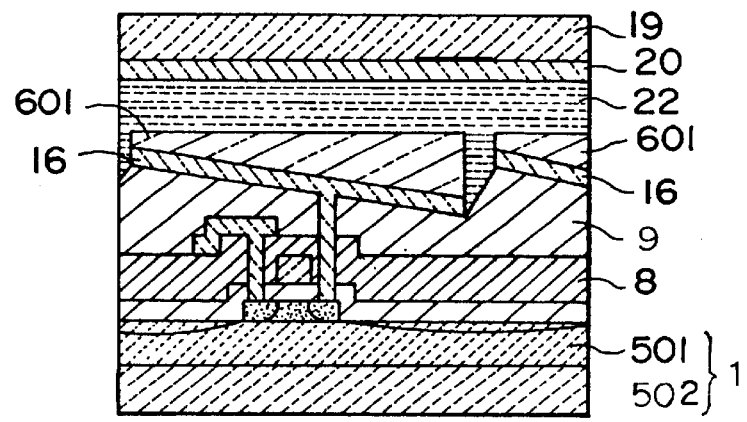
FIG. 6 is a cross sectional view showing the structure of a reflection type liquid crystal display device according to a third embodiment of the present invention.

In the reflection type liquid crystal display device according to the third embodiment, the pixel electrode 16 having the inclined main surface of the second embodiment is formed as a first pixel electrode layer. A transparent conductive film shown in FIG. 6 is formed on the pixel electrode 16, which is the first pixel electrode. The transparent conductive film is formed so that a main surface closer to the opposite electrode 20 is disposed in parallel therewith. The transparent conductive film is referred to as a second pixel electrode layer 601. Examples of the material of the second pixel electrode layer 601 are $SnO_x$ and ITO. Since the second pixel electrode layer 601 is formed of the transparent conductive film, the cell gap of each pixel can be equally formed. In addition, the effects of the pixel electrode 16 having the inclined reflecting main surface composed of a metal material with high reflecting characteristics are almost the same as those of the pixel electrode 16 of the second embodiment. Moreover, since the second pixel electrode layer 601 has a flat upper surface, the cell gap can be equally formed. Thus, even if the length between two substrates of a thin liquid crystal display panel is small (namely, the cell gap is small), the image quality can be improved.

Next, the fabrication method of the reflection type liquid crystal display device according to the third embodiment will be described. In the third embodiment, the steps until the pixel electrode 16, which is the first pixel electrode layer, is formed are almost the same as those in the second embodiment. The pixel electrode 16 is composed of two layers of Mo/Al that are laminated by sputter method. The total thickness of the two layers of the pixel electrode 16 is 0.6 $\mu$m. As the materials of the pixel electrode 16, as long as they have high reflectivity and high conductivity, other metal films may be used. Since the films are formed in a high vacuum chamber by sputter method, just after the films are formed, the reflectivity thereof is as high as 85 %. As the second pixel electrode layer 601, since ITO is used, the pixel electrode 16, which is the first pixel electrode layer, is formed of the above-described Mo/Al films rather than single Al layer. However, when no contact defect will take place, the single Al layer may be used.

Thereafter, the ITO film that is a transparent conductive film is formed on the pixel electrode 16, which is the first pixel electrode layer, is formed. The upper surface of the transparent conductor film is smoothed. Next, both the pixel electrode 16, which is the first pixel electrode layer, and the second pixel electrode layer 601 are patterned in a predetermined size. As a result, principal portions of the TFT array substrate 17 are formed.

In the third embodiment, the steps after the opposite substrate 18 is formed and the TFT array substrate 17 and the opposite substrate 18 are adhered until the liquid crystal display panel is formed are almost the same as those in the second embodiment. The liquid crystal display panel is associated with the optical system according to the first and second embodiments. As a result, a reflection type liquid crystal display device is formed. At this point, light of a light source is entered into the front surface of the base member 19 of the opposite substrate 18 with an incident angle of 10° and collection angle thereof is 8°. On the other hand, the collection angle of the light of the schlieren optical system on the light leaving side is 8°.

The reflection type liquid crystal display device according to the third embodiment can display an image with a high on/off ratio and a high contrast ratio.

Since the surface of the second pixel electrode 16 is in parallel with the surface of the opposite electrode 20, the inequality of the electric field in the liquid crystal cell. due to the inclination of the reflecting main surface of the pixel electrode 16 does not affect the image quality of a liquid crystal display device with a very small cell gap.

The second pixel electrode layer 601 according to this embodiment can be applied for not only the reflection type liquid crystal display device according to the second embodiment, but the reflection type liquid crystal display device according to the first embodiment. In addition, the material of the switching device is not limited to crystal silicon. Instead, the present invention can be applied for a reflection type liquid crystal display device having a TFT composed of polysilicon or amorphous silicon.

Fourth Embodiment

Figure 7:
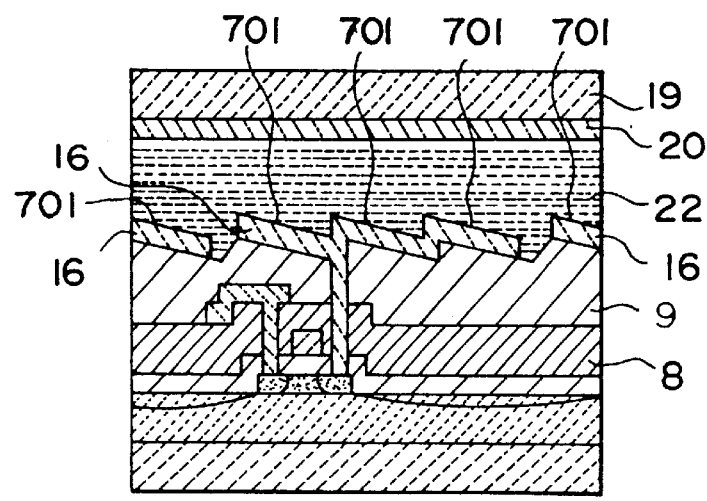
FIG. 7 is a cross sectional view showing the structure of a reflection type liquid crystal display device according to a fourth embodiment of the present invention.

In a reflection type liquid crystal display device according to a fourth embodiment, the inclined main surface of each pixel electrode 16 of the reflection type liquid crystal display device according to the second embodiment is formed of a plurality of inclined main surfaces 701. As shown in FIG. 7, the cross section of the pixel electrode 16 is formed in a saw tooth shape. The fabrication process of the reflection type liquid crystal display device according to the fourth embodiment is almost the same as that of the first and second embodiments. However, the pixel electrode 16 according to the fourth embodiment has a plurality of inclined main surfaces (namely, the cross section of the pixel electrode 16 is formed in a saw tooth shape unlike with the first and second embodiments). In other words, the surface of the second inter-layer shielding film 9 is formed in a saw tooth shape so as to form the pixel electrode 16 in a saw tooth shape. In other words, the surface of the second inter-layer shielding film 9 is patterned so that the pixel electrode 16 has a plurality of inclined main surfaces 701. Although there are various patterning methods, in this embodiment, inclined ion dry etching method is used. Experimental results conducted by the inventors of the present inventions show that each inclined opposite electrode (or the surface of the base member 1 of the TFT array substrate 17) is preferably reproduced with a taper angle of approximately 5°. Thereafter, the pixel electrode 16 for each pixel is formed on the second inter-layer shielding film 9. In this embodiment, the Al—Si layer with a thickness of 0.6 am is formed by sputter method and then patterned by etching method. As a result, the pixel electrode 16 is formed.

Since the Al—Si layer that is the materials of the pixel electrode 16 is formed in a high vacuum chamber by sputter method, just after the pixel electrode 16 is formed, the reflectivity is as high as approximately 85 %.

After the principal portions such as the pixel electrode 16 of the TFT array substrate 17 are formed, the opposite electrode 18 is formed. The later steps of the fourth embodiment are almost the same as those of the second embodiment. As a result, the principal portions of the reflection type liquid crystal display device according to the fourth embodiment are formed. At this point, as with the above-described embodiments, using the schlieren optical system as shown in FIG. 2, the reflected light is separated from the light 25 that is displayed by an aperture 26. At this point, each of the collection angle is 8°.

The reflection type liquid crystal display device formed by the above-described method can display an image with a high on/off ratio and a high contrast ratio. As described above, since one pixel is formed on a plurality of inclined main surfaces 701 at small pitches, the gap between one edge of the pixel to the opposite electrode 20 and the other edge thereof to the opposite electrode 20 is much smaller than that of the second embodiment. Thus, the inequality of the electric field due to the inclination of the inclined main surface of the pixel electrode 16 does not affect the image quality at all.

In this embodiment, a plurality of inclined main surfaces 701 are formed on the surface of the second inter-layer shielding film 9 by inclined ion dry etching method. However, the fabrication method is not limited to the above-described method. Instead, the etching method using a resist and enchant according to the second embodiment may be employed.

Fifth Embodiment

Figure 8A:
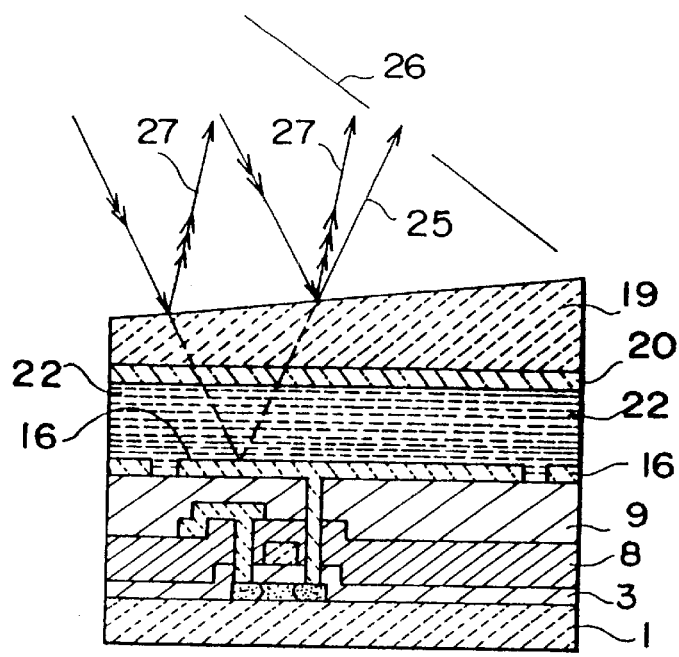
FIG. 8A FIG. 8B, and FIG. 8C are cross sectional views showing the structure of a reflection type liquid crystal display device according to a fifth embodiment of the present invention.
Figure 8B:
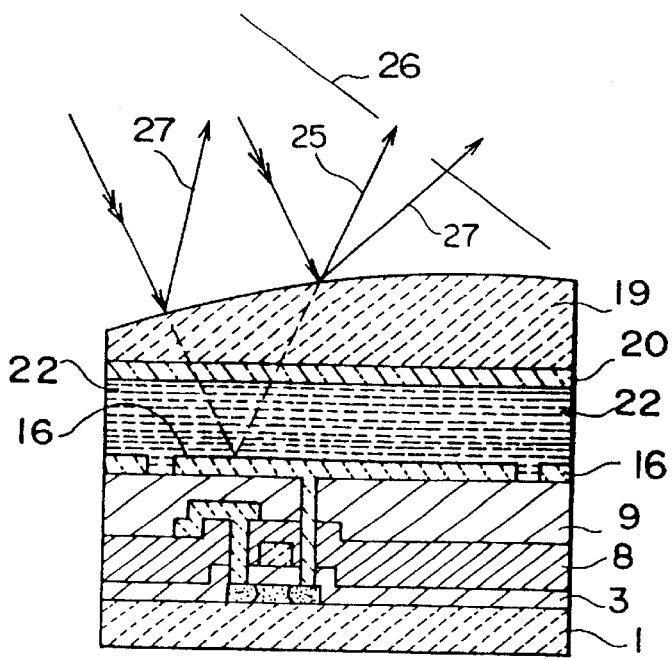
Figure 8C:
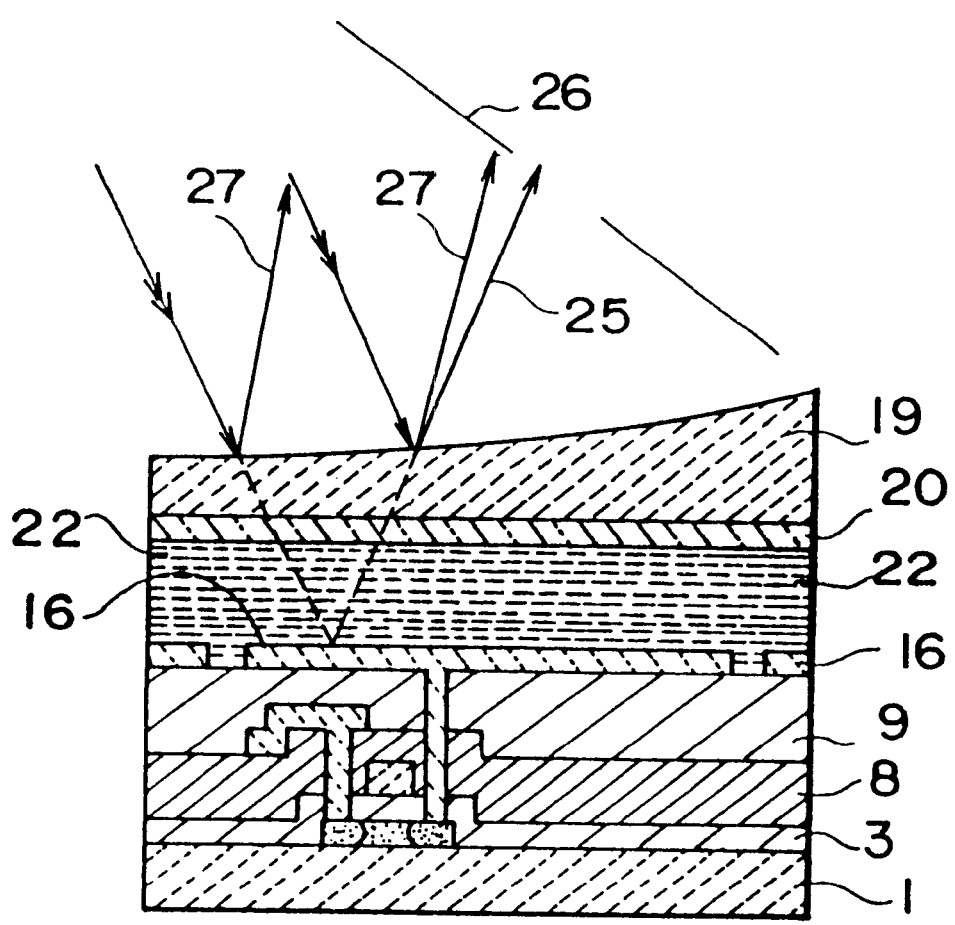

As described in the first embodiment, the separation of the undesired reflected light 27 from the light 25 that is displayed is accomplished by inclining the surface of the base member 19 of the opposite substrate 18 (namely, the main surface on the display side) to the reflecting main surface of the pixel electrode 16. Thus, in the above-described embodiments, the main surface of the pixel electrode 16 is inclined. However, it should be noted that the main surface of the base member 19 of the opposite substrate 18 may be inclined to the pixel electrode 16. Inclined surface can be a curved shape. In other words, the thickness of one edge of the base member 19 of the opposite substrate 18 is different from that of the other edge. As a result as shown in FIG. 8A, FIG. 8B, and FIG. 8C, the surface of the base member 19 of the opposite substrate 18 is inclined. In this structure, the same effects as the above-described embodiments can be obtained. Naturally, the curved area can be formed on the front surface of the opposite electrode being flat to the pixel electrode.

FIG. 8A to FIG. 8C are cross sectional views showing the structure of a reflection type liquid crystal display device according to this embodiment. In the fifth embodiment, as an example, a reflection type liquid crystal display device with a pixel size of 100 µm and a diagonal length of approximately 3 inches is formed.

In this embodiment, individual structural members of the liquid crystal cell such as the opposite electrode 20, the pixel electrode 16, the second inter-layer shielding film 9, and the TFT 7 are formed in the same manner as those of the above-described embodiments. In the fifth embodiment, the pixel electrode 16 is formed in parallel with the opposite electrode 20. The second inter-layer shielding film 9 is formed flatly, not inclined. The flat pixel electrode 16 is formed on the second inter-layer shielding film 9. In addition, the opposite electrode 20 is flatly formed in parallel with the pixel electrode 16.

The switching device of the pixel portion is not limited to the TFT. Instead, another diode device such as MIM (Metal Insulator Metal) may be used.

In this embodiment, as the activation layer of the TFT 7, polysilicon is used. As the pixel electrode 16, Al—Si is used. The refractive index $n_{1c}$ of the liquid crystal layer 22 is 1.5.

The opposite substrate 18 is formed in the following manner. A base member 19 is formed by grinding a transparent glass in one direction so that the taper angle becomes 7°. An ITO film that is a transparent conductive film is formed on almost the entire main surface facing the liquid crystal layer 22 of the base member 19. At a result, the opposite electrode 20 is formed. Experimental results conducted by the inventors of the present invention show that the collection angle of the optical system used in this embodiment is approximately 8°. Consequently, a preferable collection angle of 7° is selected. Thus, when the collection angle is small, the taper angle can be further decreased. The taper angle can be calculated from the equation described with reference to FIG. 3 in the first embodiment. A preferable taper angle is 2.6° or more. When the opposite substrate 18 is ground, the taper angle can be precisely controlled. In case the front surface of the opposite electrode is formed in a curved shape as shown in FIG. 8B, and FIG. 8C, taper angle is not a single value but having a distribution 2.6° or more.

The peripheral portions of the TFT array substrate 17 and the opposite substrate 18 are adhered with an adhesive and sealing.agent. The cell gap is filled with a liquid crystal layer 22. The filling portion of the cell gap is sealed. As a result, a liquid crystal display panel is formed. The direction of the inclination of the inclined main surface of the base member 19 of the opposite substrate 18 is the same as the direction of the optical main axis of a schlieren optical system that is mainly an aperture 26 of the main axis of the emitted light 25 that is displayed.

Experimental results of the image quality of the reflection type liquid crystal display device according to the fifth embodiment shows that the light 27 reflected on the front surface of the base member 19 of the opposite substrate 18 is effectively separated from the light 25 that is reflected from the pixel electrode 16 and that is displayed. Thus, an image free of dazzling and deterioration of contrast due to the undesired reflection can be displayed.

To prevent the image quality from degrading due to the reflection of light at the interface of the main surface in contact with the liquid crystal layer 22 of the base member 19 of the opposite substrate 18, the surface in contact with the liquid crystal layer 22 of the base member 19 of the opposite substrate 18 is inclined to the pixel electrode 16. Alternatively, as with the above-described embodiments, the technologies of which the reflecting main surface of the pixel electrode 16 is inclined may be used in combination.

Sixth Embodiment

Figure 9A:
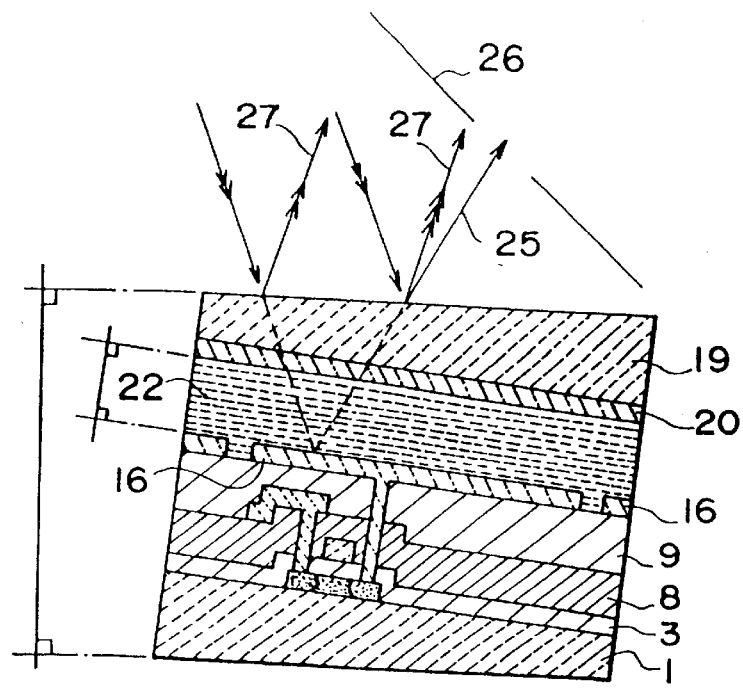
FIG. 9A, FIG. 9B, and FIG. 9C are cross sectional views showing the structure of a reflection type liquid crystal display device according to a sixth embodiment of the present invention.

In a reflection type liquid crystal display device according to a sixth embodiment of the present invention, the main surface on the display side of the base member 19 of the opposite substrate 18 is inclined to the pixel electrode 16. The main surface of the base member 1 of the TFT array substrate 17 has the same taper angle as the inclination angle of the main surface on the display side of the base member 19 of the opposite substrate 18. In addition, as shown in FIG. 9A, the inner main surface of the base member 1 is formed almost in parallel with the inner main surface of the base member 19 (that is in contact with the liquid crystal layer 22). The outer main surface of the base member 1 is formed almost in parallel with the outer main surface of the base member 19. The structural portions of the sixth embodiment such as the opposite electrode 20, the pixel electrode 16, the TFT 7, and the second inter-layer shielding film 9 in the liquid cell are the same as those of the fifth embodiment. As with the fifth embodiment, the feature of the sixth embodiment is in that the main surface of the pixel electrode 16 is formed in parallel with the main surface of the opposite electrode 20.

The outer main surfaces of the base members 1 and 19 are ground so that the base members 1 and 19 have a taper angle of 7°.

In the fifth embodiment, since the outer main surface of the base member 19 of the opposite substrate 18 is inclined to the pixel electrode 16 and the base member of the TFT array substrate 17, the thickness of one edge of the panel is different from the thickness of the other edge of the panel by the inclination angle of the base member 19 of the opposite substrate 18. However, according to the sixth embodiment, the reflecting main surface of the pixel electrode 16 is inclined to the front surface of the base member 19 of the opposite substrate 18. In addition, the front surface of the base member 19 of the opposite substrate 18 is formed in parallel with the outer surface of the TFT array substrate 17. Thus, the entire thickness of the panel is equal to a liquid crystal display panel. Consequently, the liquid crystal display panel can be more easily disposed on a display apparatus.

Figure 9B:
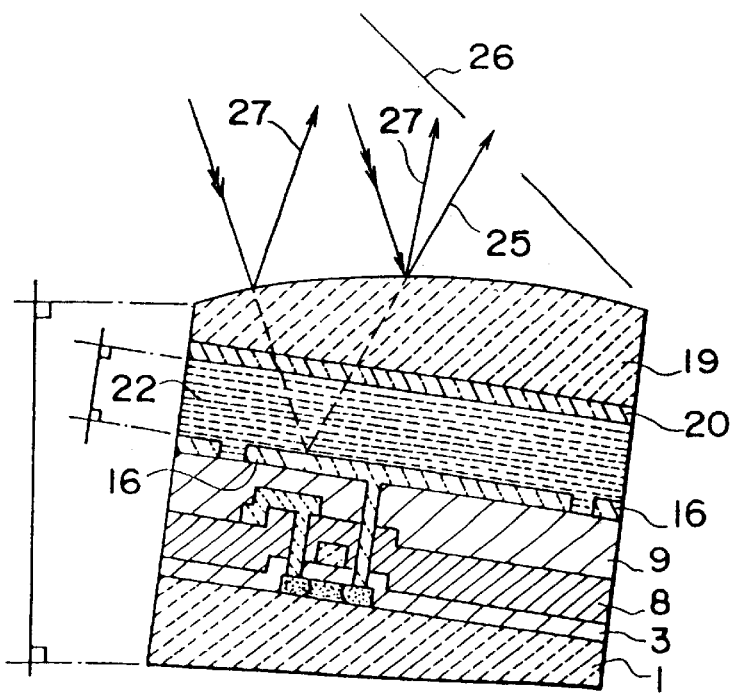
Figure 9C:
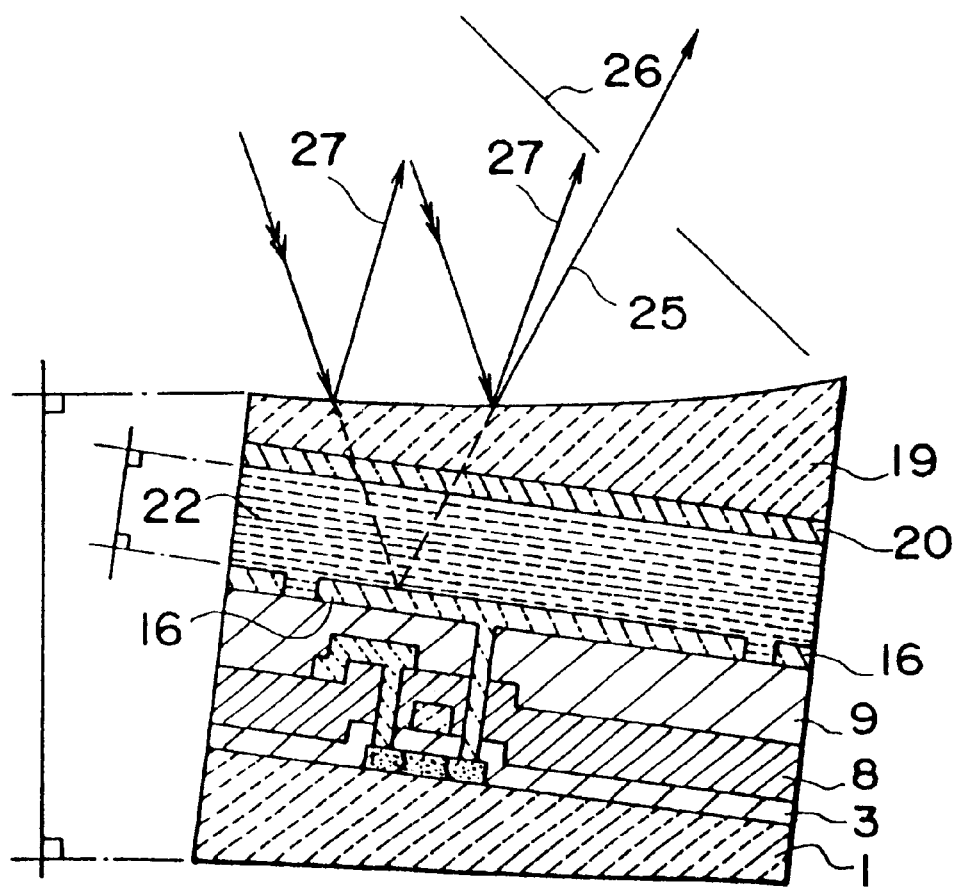

In addition, the front surface of the opposite electrode having a plurality of curved area as shown in FIG. 9B, and FIG. 9C for example. Those curved area formed on the front surface of the opposite electrode separates light so that a leaving direction of light that is reflected by the first surface of the opposite substrate is different from a leaving direction of light that is emitted from the first surface of the opposite substrate after having been reflected by the pixel electrodes through the liquid crystal layer, as well.

Seventh Embodiment

Figure 10A:
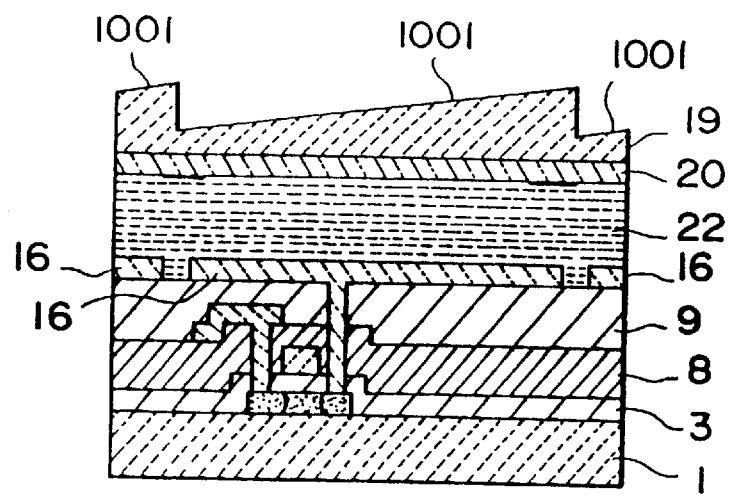
FIG. 10A, FIG. 10B, and FIG. 10C are cross sectional views showing the structure of a reflection type liquid crystal display device according to a seventh embodiment of the present invention.
Figure 10B:
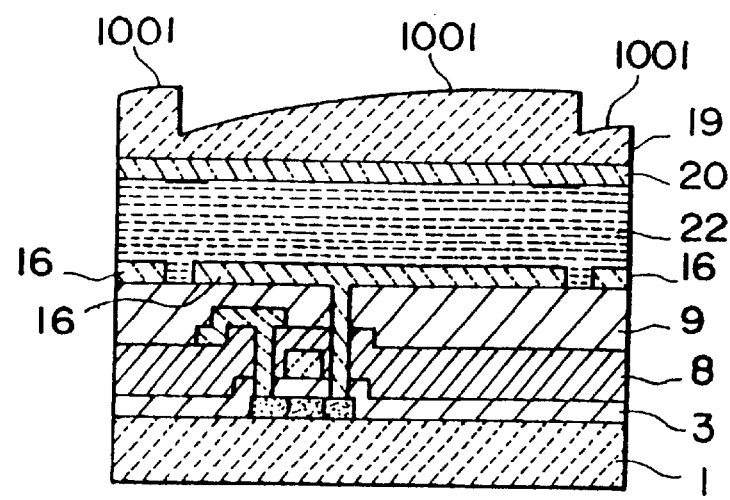
Figure 10C:
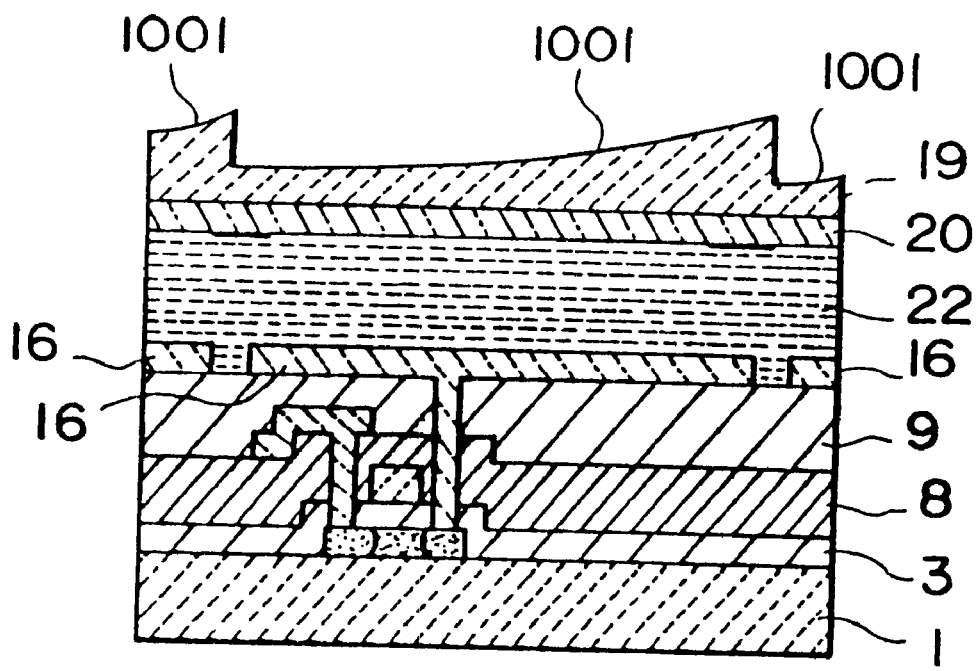

In a reflection type liquid.crystal display device according to a seventh embodiment, the inclination of the front surface of the base member 19 of the opposite substrate 18 according to the sixth embodiment is formed of a plurality of inclined surfaces 1001 corresponding to the pitch and position of each pixel electrode 16. Those inclined surface can be formed in a curved shape. In other words, the cross section of the base member 19 is formed in a saw tooth shape, the pitch thereof is corresponding to the pixel pitch and pixel position. The reflection type liquid crystal display device has a pixel size of 100 µm and a diagonal length of approximately 3 inches. The taper angle of the outer surface of the base member 19 of the opposite substrate 18 is 7° as with the sixth embodiment. The other structure and fabrication method of the seventh embodiment are almost the same as those of the sixth embodiment. The structure of the reflection type liquid crystal display device according to the seventh embodiment is shown in FIG. 10A, FIG. 10B and FIG. 10C. As with the sixth embodiment, the reflection type liquid crystal display device according to the seventh embodiment separates the undesired light reflected on the main surface of the base member 19 of the opposite substrate 18, thereby displaying an image with a high quality.

As an alternative fabrication method of the TFT array substrate 17, a quartz substrate may be used as the base member 1. A polysilicon film may be formed on the quartz substrate by solid phase crystalization method. With the polysilicon film, a TFT may be formed. As a result, a drive circuit and so forth may be formed on the same substrate.

Eighth Embodiment

In a reflection type liquid crystal display device according to an eighth embodiment, the inclined main surface of the base member 19 of the opposite substrate 18 according to the fifth embodiment is formed of a plurality of inclined main surfaces at smaller pitches (⅓ pitches) than those of the seventh embodiment. Those inclined surface can be formed in a curved shape. The structure of the reflection type liquid crystal display device according to the eighth embodiment is shown in FIG. 11A, FIG. 11B, and FIG. 11C.

Figure 11A:
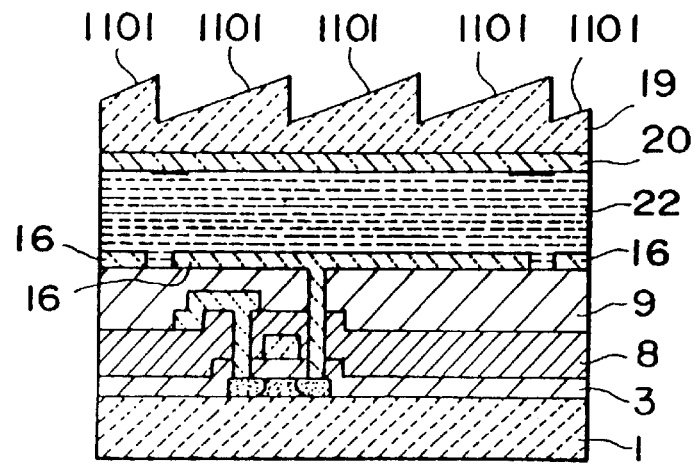
FIG. 11A, FIG. 11B, and FIG. 11C are cross sectional views showing the structure of a reflection type liquid crystal display device according to an eighth embodiment of the present invention.
Figure 11B:
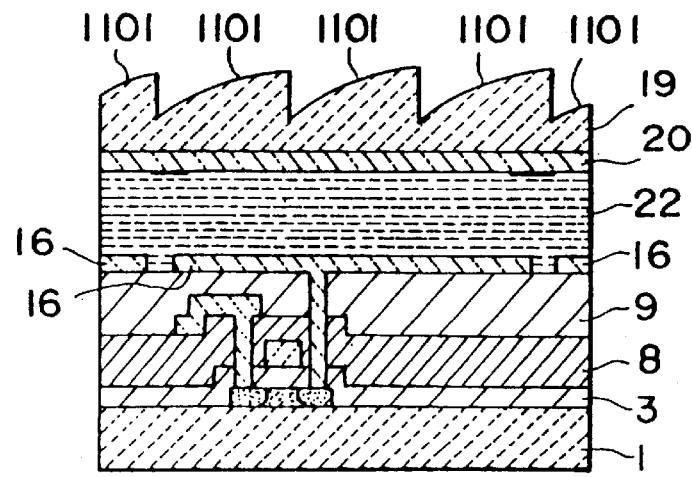
Figure 11C:
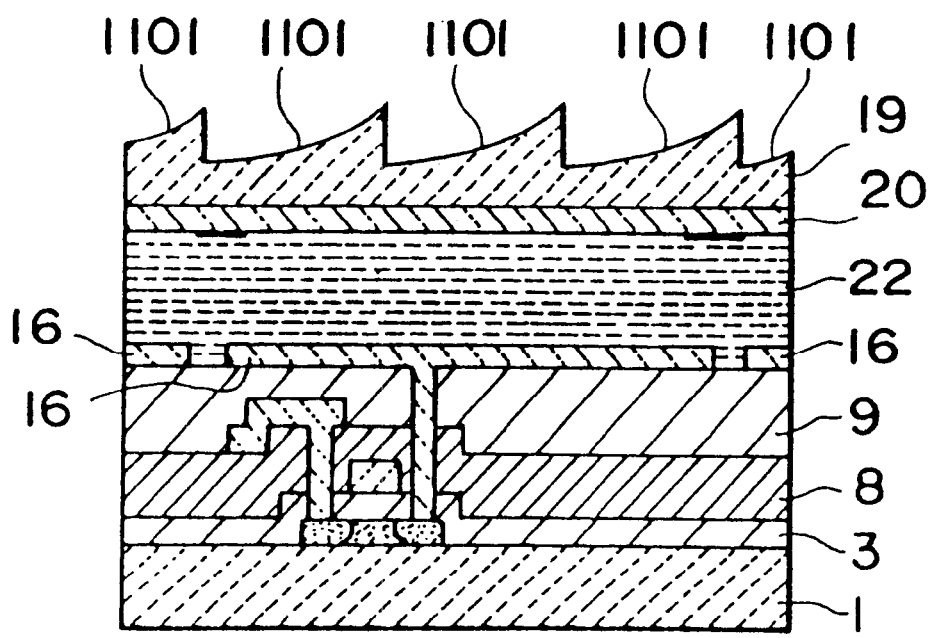

In the eighth embodiment, as shown in FIG. 11, three inclined main surfaces 1101 are formed every pixel pitch. The taper angle of each inclined main surface 1101 is 7°, in FIG. 11A. The average inclination angle of each inclined curved surface 1101 is 7°, in FIG. 11B, and FIG. 11C.

In the reflection type liquid crystal display device according to the eighth embodiment, undesired reflected light 27 can be effectively separated from the light that is displayed. As a result, an image with a high quality can be displayed.

In FIG. 11A, FIG. 11B, and FIG. 11C, for simplicity, a light shielding film (black matrix) that prevents light from entering the TFT 7 is omitted. Likewise, in each of the fifth to seventh embodiments, the light shielding film was omitted.

Ninth Embodiment

Figure 12A:
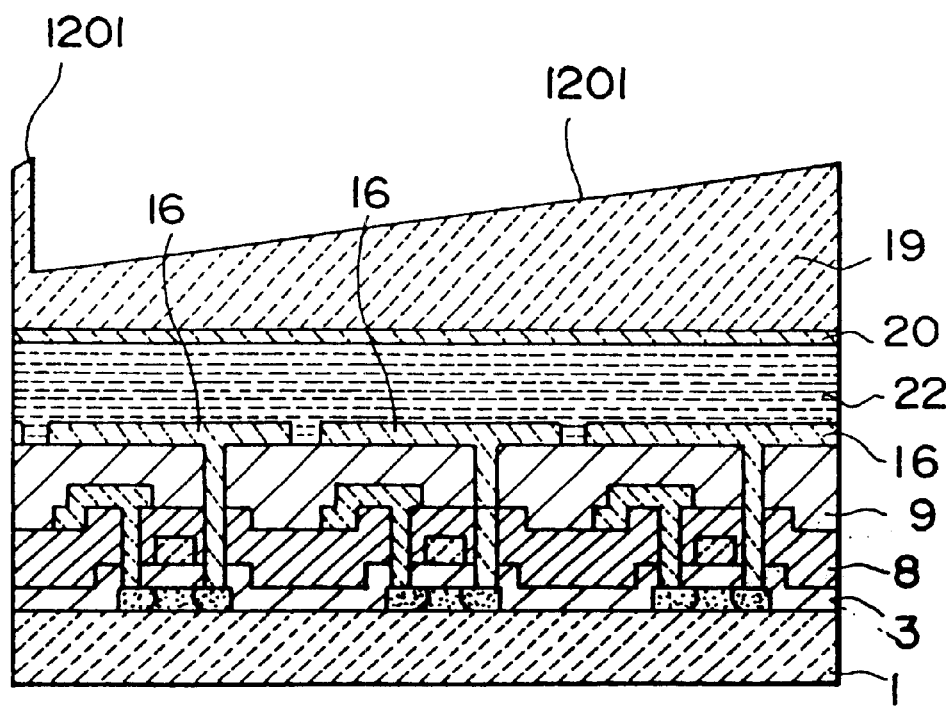
FIG. 12A, FIG. 12B, and FIG. 12C are cross sectional views showing the structure of a reflection type liquid crystal display device according to a ninth embodiment of the present invention.
Figure 12B:
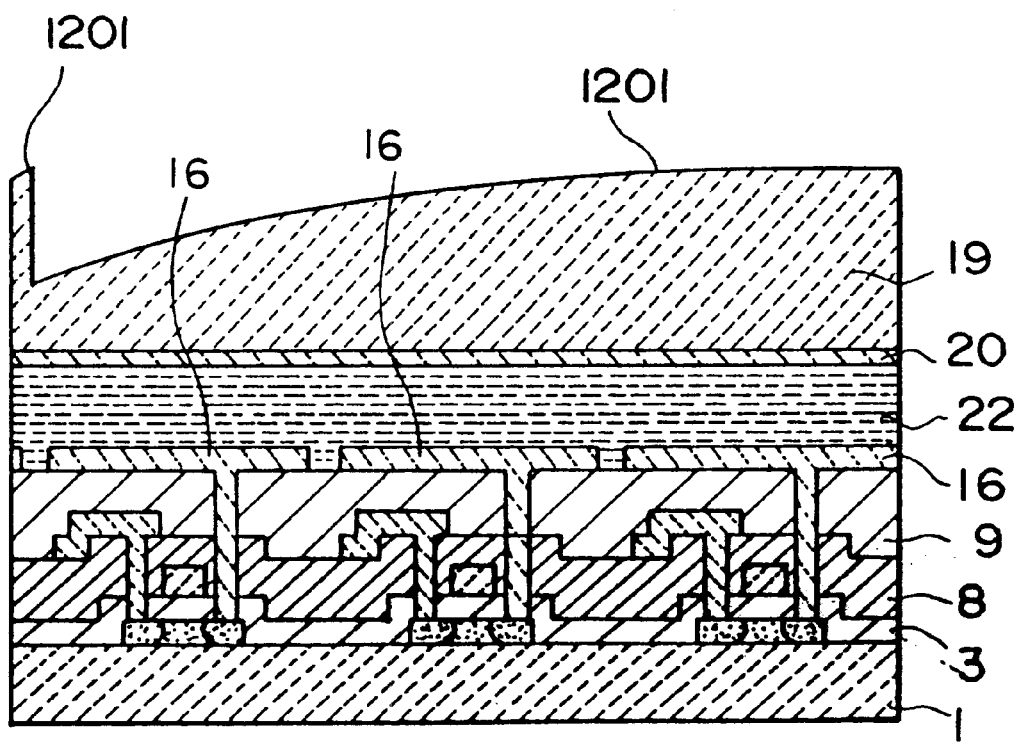
Figure 12C:
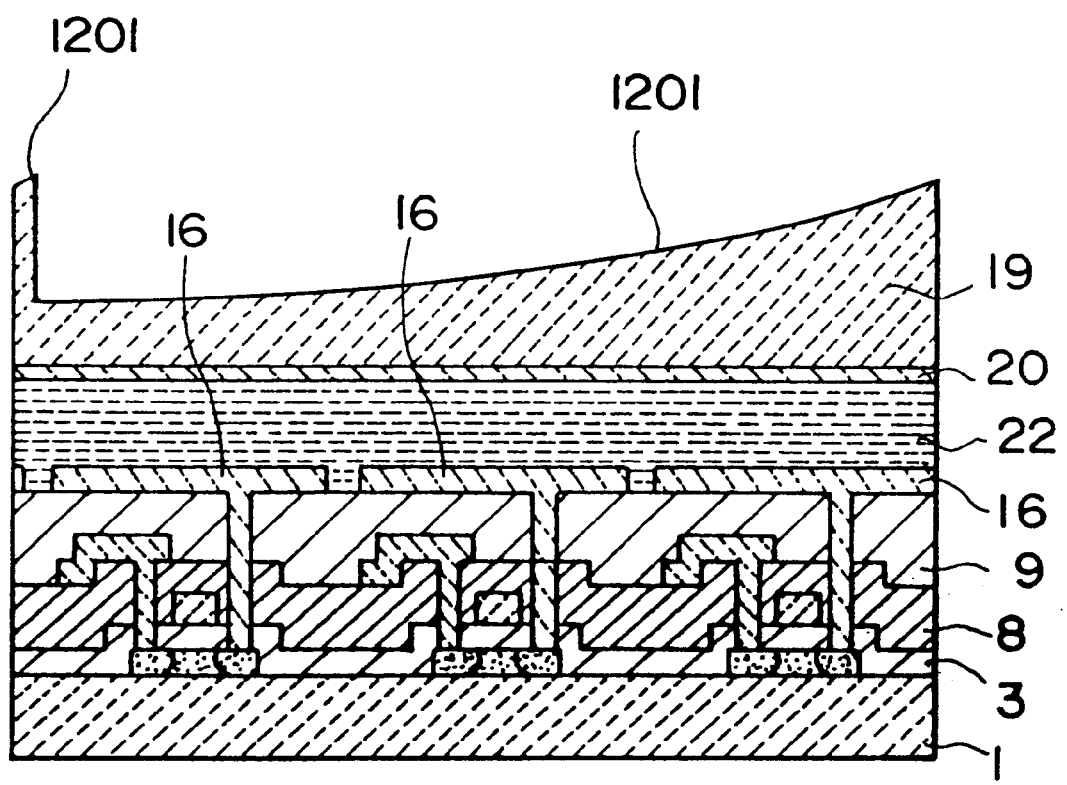

Unlike with the eighth embodiment, in a ninth embodiment, the inclined main surface of the base member 19 of the opposite substrate 18 is formed of a plurality of inclined main surfaces at pitches larger than one pixel. Specifically, the front surface of the base member 19 of the opposite substrate 18 is formed so that one inclined main surface 1201 is disposed (shared by) every four pixels (namely, every four adjacent pixel electrode 16). The structure of the reflection type liquid crystal display device according to the ninth embodiment is shown in FIG. 12A, FIG. 12B and FIG. 12C.

In the ninth embodiment, one inclined surface which can be formed both in linearly or in curved shape, is faced with every four adjacent pixels. However, it should be noted that the present invention is not limited to such a structure. Instead, one inclined main surface may be shared by every nine pixels (three pixels ×three pixels, and three pixels can be made of RGB pixels). Alternatively, one inclined main surface may be shared by three pixels in vertical direction and a half pixel in horizontal direction of a display screen. In other words, the number of pixels corresponding to one inclined main surface 1201 may be varied. The taper angle of each inclined main surface is 7°. Experimental results show that the reflection type liquid crystal display device according to this embodiment can effectively separate the undesired reflected light 27 from the light 25 that is displayed, thereby displaying an image with a high quality.

Figure 19:
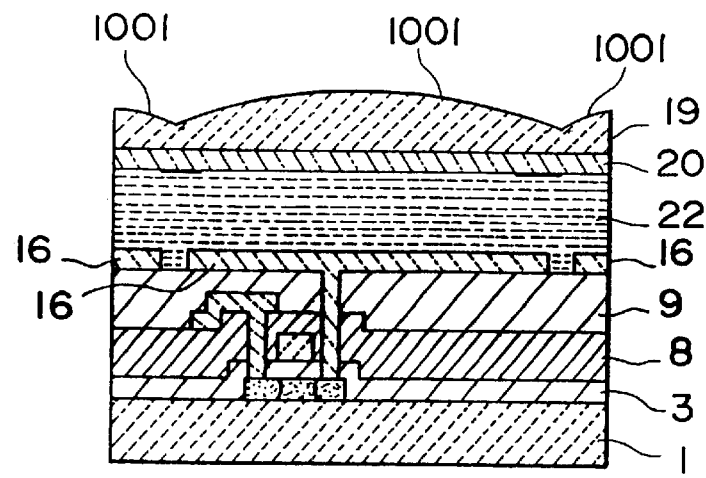
FIG. 19, FIG. 20, and FIG. 21 are showing cross sectional views of the structure of a reflection type liquid crystal display device in the present invention which having a plurality of curved area formed on the front surface of the opposite substrate.
Figure 20:
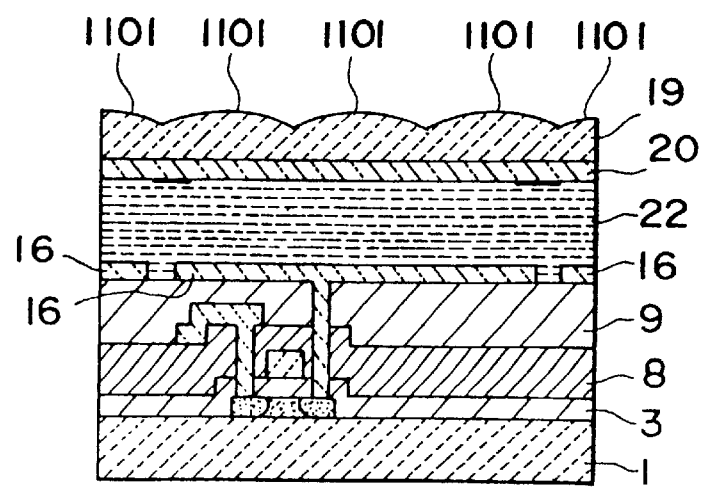
Figure 21:
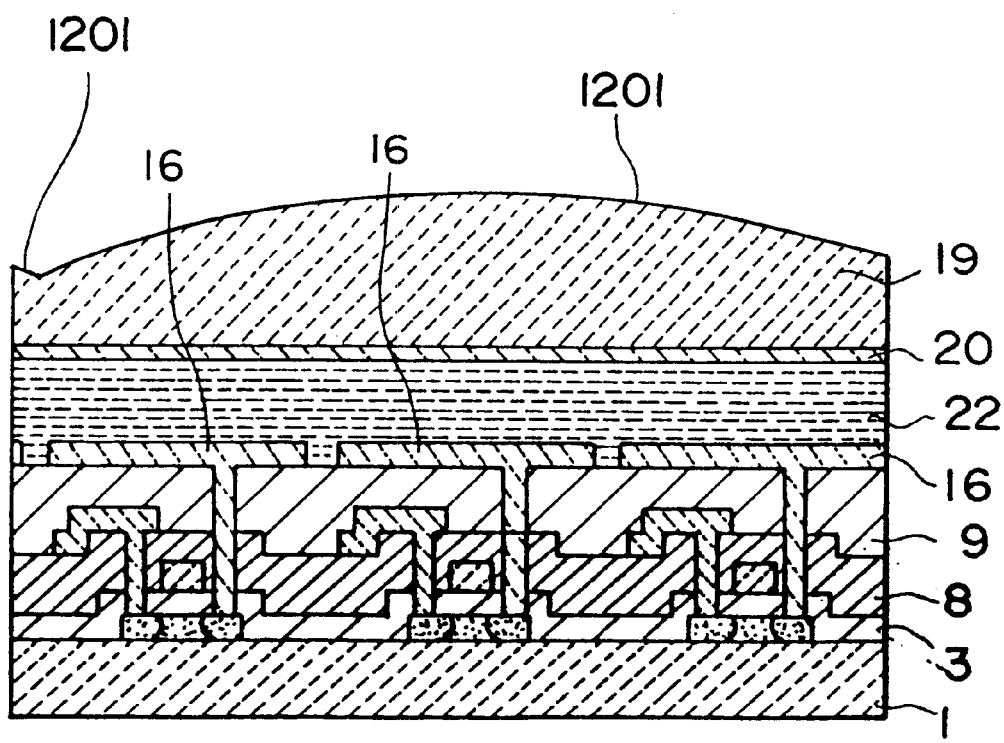

In addition, the front surface having a plurality of curved area described in the fifth to ninth embodiments, the curved area is formed on the inclined surface having a predetermined inclination angle as described above. However, it is also possible to form a curved area on the flat surface as shown in FIG. 19, FIG. 20, and FIG. 21. Since those curved surface having a distribution of inclined angle, they are capable of separating effectively the undesired reflected light 27 from the light 25 that is displayed, thereby displaying an image with a high quality.

Tenth Embodiment

Figure 13:
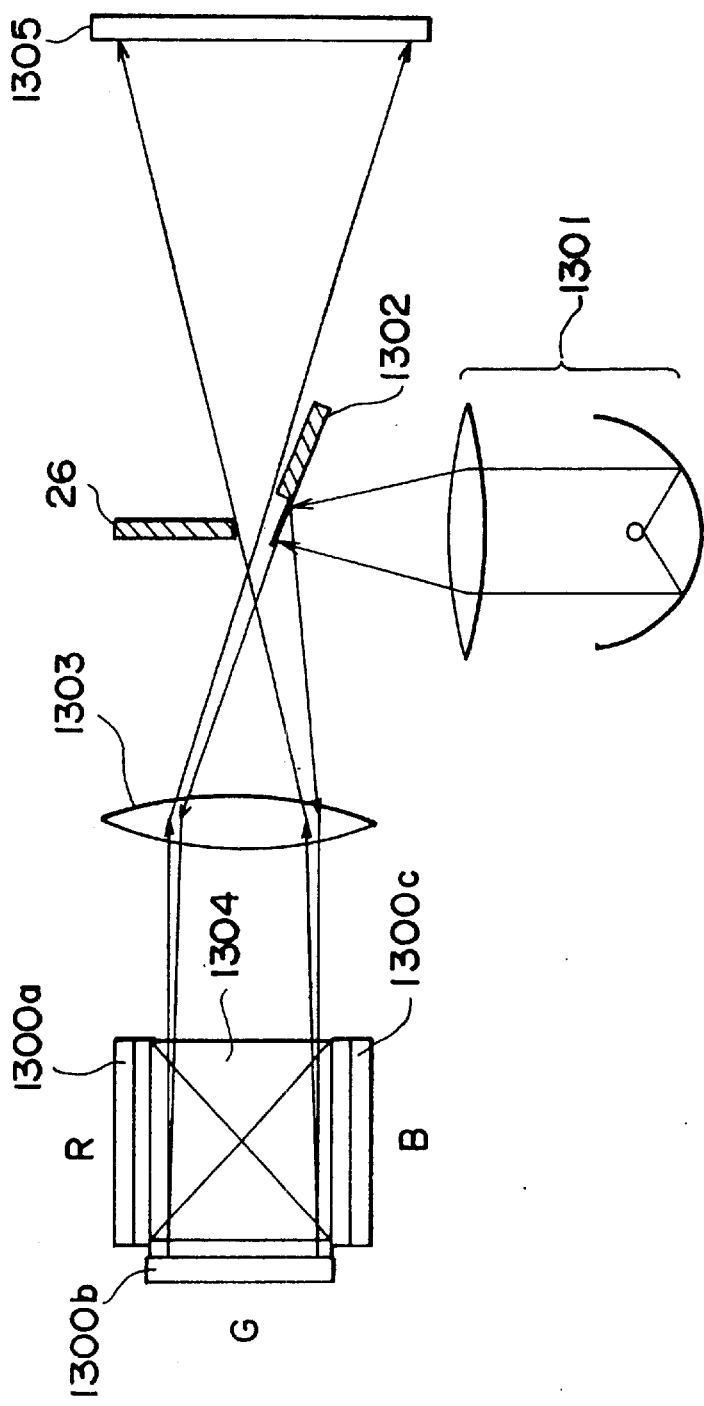
FIG. 13 is a schematic diagram showing a projection type display apparatus using a reflection type liquid crystal display device according to the present invention.

A tenth embodiment of the present invention is a projection type display apparatus that includes one of the reflection type liquid crystal display devices according to the first to ninth embodiments. The projection type display apparatus projects a color image to a screen (for example, a large screen larger than 30 inches) through an optical system. Next, with reference to FIG. 13, the projection type display apparatus according to the tenth embodiment will be described. In this embodiment, liquid crystal display panels for color components R (red), G (green), and B (blue) that are the reflection type liquid crystal display devices according to the fifth embodiment of which the surface of the base member 19 of the opposite substrate 18 is inclined or curved are used. It should be noted that as the liquid crystal display panels, the reflection type liquid crystal display devices according to another embodiment of the present invention may be used, as well.

The liquid crystal display panels are designated for R, G and B. Thus, a total of three liquid crystal display panels 1300a, 1300b and 1300c are used.

Light of a light source emitted from a metal halide lamp 1301 is reflected to a different direction by a reflection mirror 1302. The reflected light travels to a dichroic prism 1304 through a condenser lens 1303. In the dichroic prism 1304, the incident light is diverged into three rays of colors R, G, and B. The diverged rays of colors R, G and B enter the liquid crystal c, respectively. At that time, the collection angle θ of incident light is given by the following equation.

θ=arc tan (D/F1)

where D1 is diameter of the reflection mirror 1302, and F1 is back focus length of the condenser lens 1303.

When the rays of colors R, G. and B enter the liquid crystal display panels 1300a, 1300b, and 1300c, they are reflected on the reflecting main surfaces of their pixel electrodes and then transmitted to the dichroic prism 1304. In the dichroic prism 1304, the rays emitted from the three liquid crystal display panels 1300a, 1300b, and 1300c are converged. The converged light is transmitted from the dichroic prism 1304 to the condenser lens 1303 through the reverse path. At this point, since the front surface of the base member 19 of the opposite substrate 18 of each of the liquid crystal display panel 1300a, 1300b and 1300c is inclined to the reflecting main surface of the corresponding pixel electrode 16, the undesired light 27 reflected on the front surface of the base member 19 of the opposite substrate 18 is separated from the light 25 that is reflected on the reflecting main surface of the pixel electrode 16 and then transmitted to the display main surface. Thus, the undesired reflected light 27 is removed. The light emitted from the dichroic prism 1304 travels to the condenser lens 1303 through the reverse path. The resultant light is condensed by the condenser lens 1303. Thereafter, the resultant light passes through an aperture 26 and then is projected to the screen 1305. Since the undesired reflected light is effectively separated on the front surface of each of the liquid crystal display panels, an image free of deterioration of contrast in dark condition can be obtained with a contrast ratio of approximately 50:1.

Calculation results conducted by the inventors of the present invention show that when individual portions such as the optical system and the condenser lens are modified, an image with a higher contrast ratio than the results of this embodiment can be accomplished.

Eleventh Embodiment

An eleventh embodiment of the present invention is a direct view type display apparatus including one of the reflection type liquid crystal display devices according to the first to ninth embodiments of the present invention. Next, with reference to FIG. 14A and 14B, the direct view type display apparatus according to the eleventh embodiment will be described.

Figure 14A:
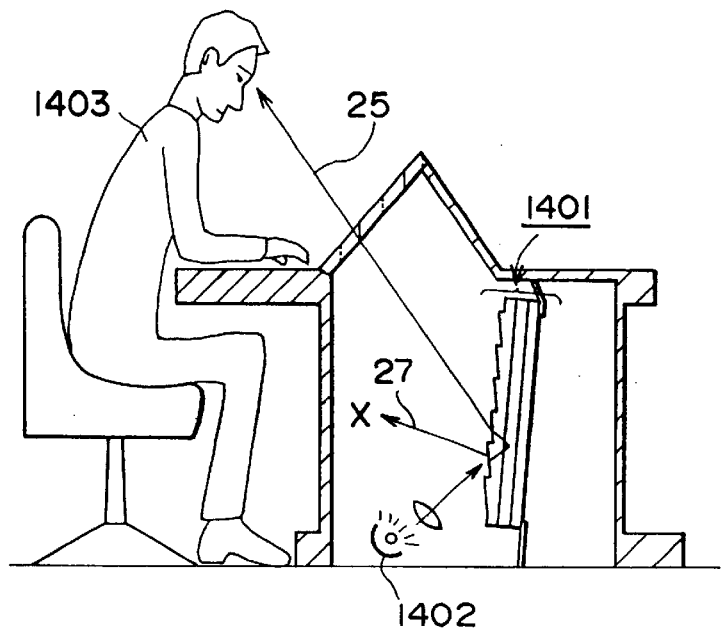
FIG. 14A is a schematic diagram showing a direct view type display apparatus using a reflection type liquid crystal display device according to the present invention (the view line to a screen is almost fixed, for example a display terminal screen for an information processing apparatus such as a display screen is mounted on an operation panel)

As shown in FIG. 14A, the direct view type display apparatus according to the eleventh embodiment is a display apparatus suitable for a display terminal screen (for use with an information processing apparatus or the like) and an apparatus such as a display screen mounted on an operation panel for an apparatus (of which the view line is almost fixed or limited to a predetermined range).

A liquid crystal display panel 1401 is specifically the reflection type liquid crystal display device according to the seventh embodiment of which the front surface of the base member 19 of the opposite substrate 18 is inclined. The reflection type liquid crystal display device can display a color image with one color filter for three colors R, G, and B. The diagonal length of the device is approximately 30 cm. It should be noted that the liquid crystal display panel 1401 may be the reflection type liquid crystal display device according to one of the above-described embodiments.

A spot light 1402 that is a light source is disposed at a lower diagonal position of the liquid crystal display panel

1401. The spot light 1402 radiates the light to the liquid crystal display panel 1401. It should be noted that the spot light 1402 may be disposed at an upper position, a right position, or a left position of the liquid crystal display panel 1401 to radiate the light to the liquid crystal display panel 1401. At this point, each of the inclined main surfaces formed on the front surface of the base member 19 of the opposite substrate 18 should be disposed in the direction as shown in FIG. 14A so as to separate the light 25 that is reflected on the reflecting main surface of the pixel electrode 16 and displayed from the undesired light 27 that is reflected on the front surface of the base member. In the projection type display apparatus according to the eleventh embodiment, the light that is emitted from the spot light 1402, which is the light source, is reflected on the reflecting main surface of the pixel electrode 16. Thereafter, the reflected light travels to the opposite substrate 18 through the liquid crystal layer 22 and then enters the eyes of a viewer 1403 who directly views an image. On the other hand, the undesired light 27 that is reflected on the front surface of the base member 19 of the opposite substrate 18 is directed to for example a lower direction that is out of the view line of the viewer 1403. Thus, the viewer 1403 does not suffer from dazzling of the undesired reflected light 27. In addition, since the contrast ratio does not deteriorate, even if the viewer directly views the screen, his or her eyes will not tire. Thus, he or she can comfortably view an image.

Figure 14B:
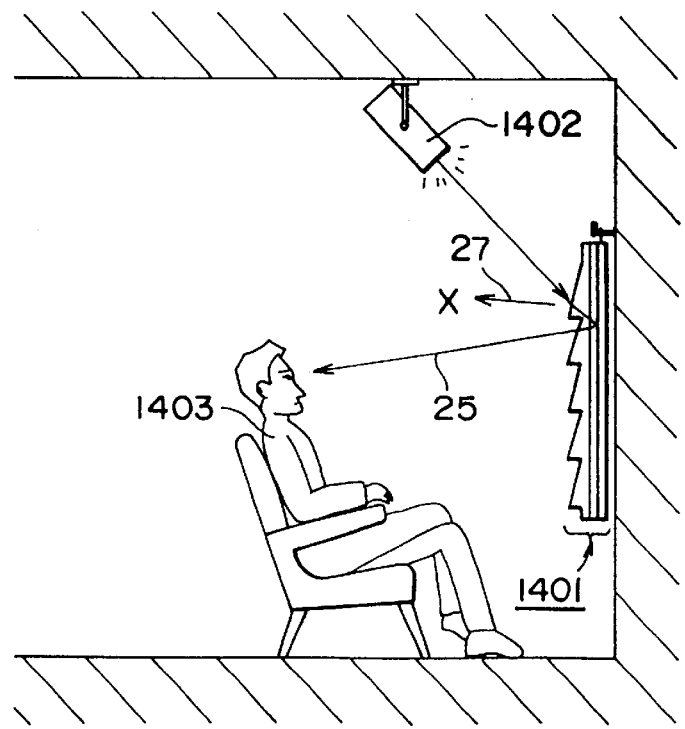
FIG. 14B is a schematic diagram showing a direct view type display apparatus using a reflection type liquid crystal display device according to the present invention (for example, a direct view type display apparatus applied for a wall hanging type TV set)

Alternatively, the direct view type display apparatus according to the eleventh embodiment can be applied for a wall hanging type TV set as shown in FIG. 14B. In this case, the spot light 1402 may be disposed above the liquid crystal display panel 1401 (for example, the spot light 1402 may be hung from the ceiling) so as to supply the light of the light source to the liquid crystal display panel 1401. According to the wall hanging type TV set using the direct view type display apparatus, an image free of dazzling due to reflected light can be displayed with a high contrast ratio.

In addition, according to the direct view type display apparatus according to this embodiment, light radiated from a lighting device in a room other than the light source such as the spot light can be separated as the undesired reflected light 27 from the light 25 that is displayed. Thus, an image free of reflected light and reflected image on the display screen can be displayed with a high contrast ratio.

In each of the first to fourth embodiments, the inclined main surface of the pixel electrode 16 is formed by inclining the front surface of the second inter-layer shielding film 9 disposed below the pixel electrode 16. However, it should be noted that the present invention is not limited to such a structure. In other words, for example, the pixel electrode 16 may be thickly formed. The pixel electrode 16 may be ground or etched out so that the surface thereof is inclined.

The front surface of the pixel electrode 16 may be formed in a taper shape so that the pixel electrode 16 is inclined.

In each of the fifth to tenth embodiments, the front surface of the base member 19 of the opposite substrate 18 is ground or dry etched so as to form an inclined main surface. However, it should be noted that the present invention is not limited to such a method.

Alternatively, the base member 19 of the opposite substrate 18 may be formed in the following manner. A base member with flat main surfaces such as a glass substrate may be prepared. A second base member that is composed of a material with the same optical characteristics (such as the same refractive index and the same transmissivity) as those of the first base member may be prepared. The second base member may be adhered to the first base member with an adhesive resin with optically the same characteristics as those of the first base member and the second base member. As a result, a taper shaped base member 19 of the opposite substrate may be formed.

As described in the first to eleventh embodiments, according to the present invention, the reflection type liquid crystal display device and a display apparatus therewith can separate the light that is displayed from the light that is reflected on the front surface of the liquid crystal display panel and can display a high quality image free of deterioration of luminance characteristics and deterioration of a contrast ratio due to the reflected light.

Twelfth Embodiment

A twelfth embodiment of the present invention is a reflection type liquid crystal projector including one of the reflection type liquid crystal display devices according to one of the above-described embodiments of the present invention. Next, with reference to FIG. 15, the reflection type liquid crystal projector will be described.

Figure 15:
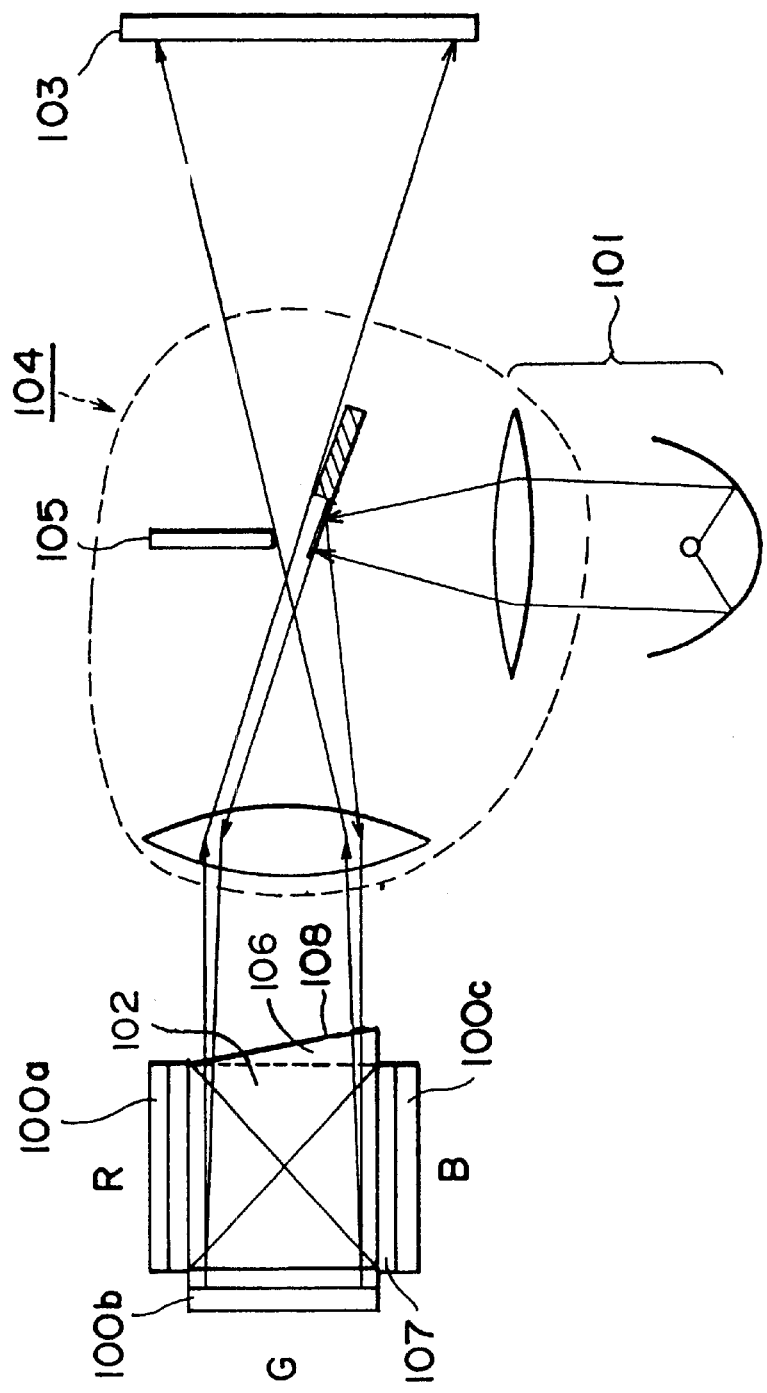
FIG. 15 is a schematic diagram showing the construction of a reflection type liquid crystal display apparatus according to the present invention.

As shown in FIG. 15, the reflection type liquid crystal projector comprises three reflection type liquid crystal display panels 100a, 100b, and 100c, a light source 101, a dichroic prism 102, a screen 103, an optical system 104, an aperture 105, and a reflection optical system 106. Each of the reflection type liquid crystal display panels 100a, 100b, and 100c is formed in the following manner. A transparent electrode is formed on a first substrate. A reflection electrode is formed on a second substrate. The two electrode substrates are disposed in opposite relation with a space. A liquid crystal layer is formed between the two electrode substrates. A voltage is applied between the two electrodes so as to control the transmission of the light that passes through one of the substrates and the transparent electrode. The two reflection type liquid crystal display panels 100a and 100b are disposed in opposite relation with a space. The remaining reflection type liquid crystal display panel 100c is disposed perpendicular to each of the reflection type liquid crystal display panels 100a and 100b. The dichroic prism 102 is formed in a rectangular parallelopiped shaped and disposed almost in parallel with the main surface of each of the reflection type liquid crystal display panel 100a, 100b, and 100c. The dichroic prism 102 diverges light of the light source 101 into three rays. The dispersed rays of light are entered into the three reflection type liquid crystal display panels 100a, 100b, and 100c. The entered rays of light are reflected by the reflection electrodes of the reflection type liquid crystal display panels 100a, 100b, and 100c. The reflected rays are converted reversely in the direction of the optical axis. The dichroic prism 102 is a color separating/synthesizing means. The optical system 104 includes a light guiding system and a schlieren optical system. The light guiding system guides the light of the light source 101 to the dichroic prism 102. The schlieren optical system projects the light that is reflected on the reflecting electrodes of the liquid crystal display panels 100a, 100b, and 100c, transmitted to the liquid crystal layers, and emitted to the front surfaces of the transparent electrodes to the screen 103. The reflection optical system 106 reflects undesired light other than light that is emitted by the light source and reflected on the front surface of the dichroic prism 102 at an angle that is different from the optical axis so that the reflected light does not pass through the aperture stop of the schlieren optical system. The reflection optical system 106 is composed of a transparent material with almost the same refractive index as the dichroic prism 102. The reflection optical system 106 has an inclination angle to the main surface on the light leaving side. The reflection optical system 106 is adhered to the main surface on the light leaving side of the dichroic prism 102.

Since the liquid crystal display panels for use in the reflection type projector are reflection type liquid crystal display panels, for simplicity, the illustration and description thereof are omitted. The reflection type liquid crystal display panels according to the twelfth embodiment are conventional TFT active matrix type liquid crystal display panels. Each of the liquid crystal display panels has a pixel size of 100 μm and a diagonal length of approximately 3 inches. The projection type liquid crystal projector includes three reflection type liquid crystal display panels for R, G, and B. As the liquid crystal layer, a polymer dispersed type liquid crystal is used so as to improve the luminance. Alternatively, conventional TN type or STN type liquid crystal display devices may be used.

Between each of the liquid crystal display panels 100*a*, 100*b*, and 100*c* and the dichroic prism 102, an optical matching layer 107 is formed.

The liquid crystal display panels 100*a*, 100*b*, and 100*c* are adhered to the three main surfaces of the dichroic prism 102 with an acrylic adhesive resin whose refractive index is 1.5.

At this point, the main surface on the light incidence side of the dichroic prism 102 is inclined as the inclined surface 108, not perpendicular to the optical axis. The inclined surface can be formed in curved shape. Alternatively, a wedge shape or a triangular prism shape reflection optical system 106 is adhered to the main surface on the light incident side of the dichroic prism 102. Consequently, the light that is reflected on the liquid crystal display panel and that is displayed is separated from the undesired light that is reflected on the front side of the dichroic prism 102. As a result, a reflection type display apparatus with a high on/off ratio and a high contrast ratio can be accomplished.

Figure 16:
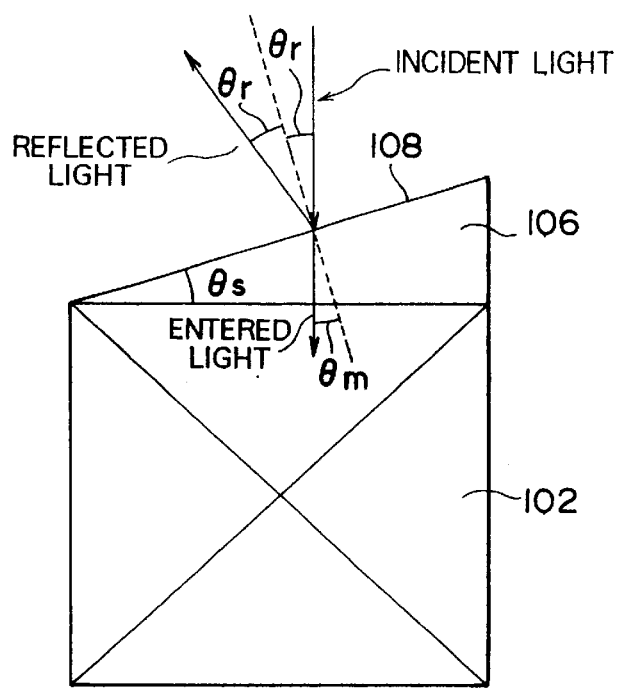
FIG. 16 is a schematic diagram showing incident light and reflected light on the front surface of a dichroic prism 102 of a reflection type liquid crystal projector.

As described above, it is very important for the reflection type liquid crystal display apparatus to separate undesired light that is reflected on the substrate or the light leaving side (screen) from light that is reflected on the pixel electrode and displayed so as to improve the luminance of the display screen and the contrast ratio. The angle of the pixel electrode to the surface direction can be calculated as follows. FIG. 16 is a schematic diagram showing incident light and reflected light. The surface 108 can be formed in a curved shape.

The incident surface on the light source side of the conventional dichroic prism 102 is inclined for θs. Light is entered into the inclined surface at an inclined angle θi to the normal. At this point, the collection angle θc at the aperture 105 should satisfy the following condition.

$$\theta c < (\theta i + \theta r) = 2 \times \theta i \quad (1)$$

where θm is the entering angle of the light to the dichroic prism 102; and θr is the reflecting angle on the front surface of the dichroic prism 102.

When light is vertically entered into the dichroic prism (namely, θm =θs), the following equation is satisfied.

$$n = \sin \theta i / \sin \theta m \quad (2)$$

where n is the refractive index (the refractive index n of glass to air is 1.5).

In other words, the relation of θi and θs can be obtained from Snell's law.

When the collection angle is 5 degrees, the incident angle θi is preferably 2.5 degrees or more due to the equation (1). When the result is substituted into the equation (2), the inclination angle of the substrate is given by the following equation.

$$\theta s = \arcsin ((\sin \theta i)/n) \quad (3)$$

where θs is the inclination angle of the substrate.

From the equation, it is clear that θs is 1.7 degrees or greater.

At this inclination angle, the effect of the prism by the reflection optical system 106 can be optically ignored. The inclination angle of the reflection optical system 106 can be obtained by grinding one main surface of the dichroic prism 102 or adhering a glass substrate with an inclined surface.

Figure 17:
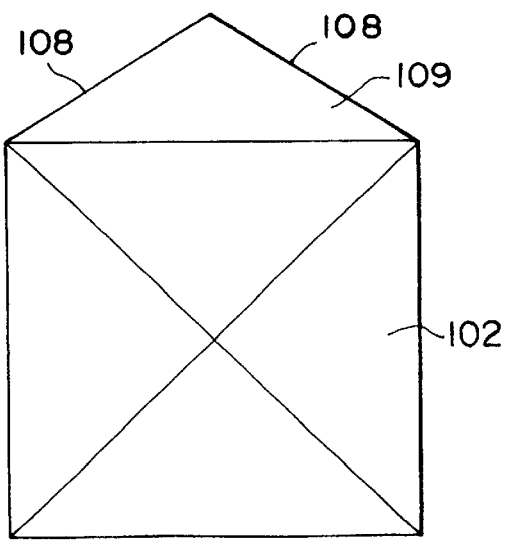
FIG. 17 is a schematic diagram showing a reflection optical system 109 according to the present invention.

The shape of the reflection optical system 106 is not limited to the above-described wedge shape. Alternatively, the shape of the reflection optical system 106 may be a triangular prism shape with a cross section of an isosceles triangle as shown in FIG. 17.

Figure 18:
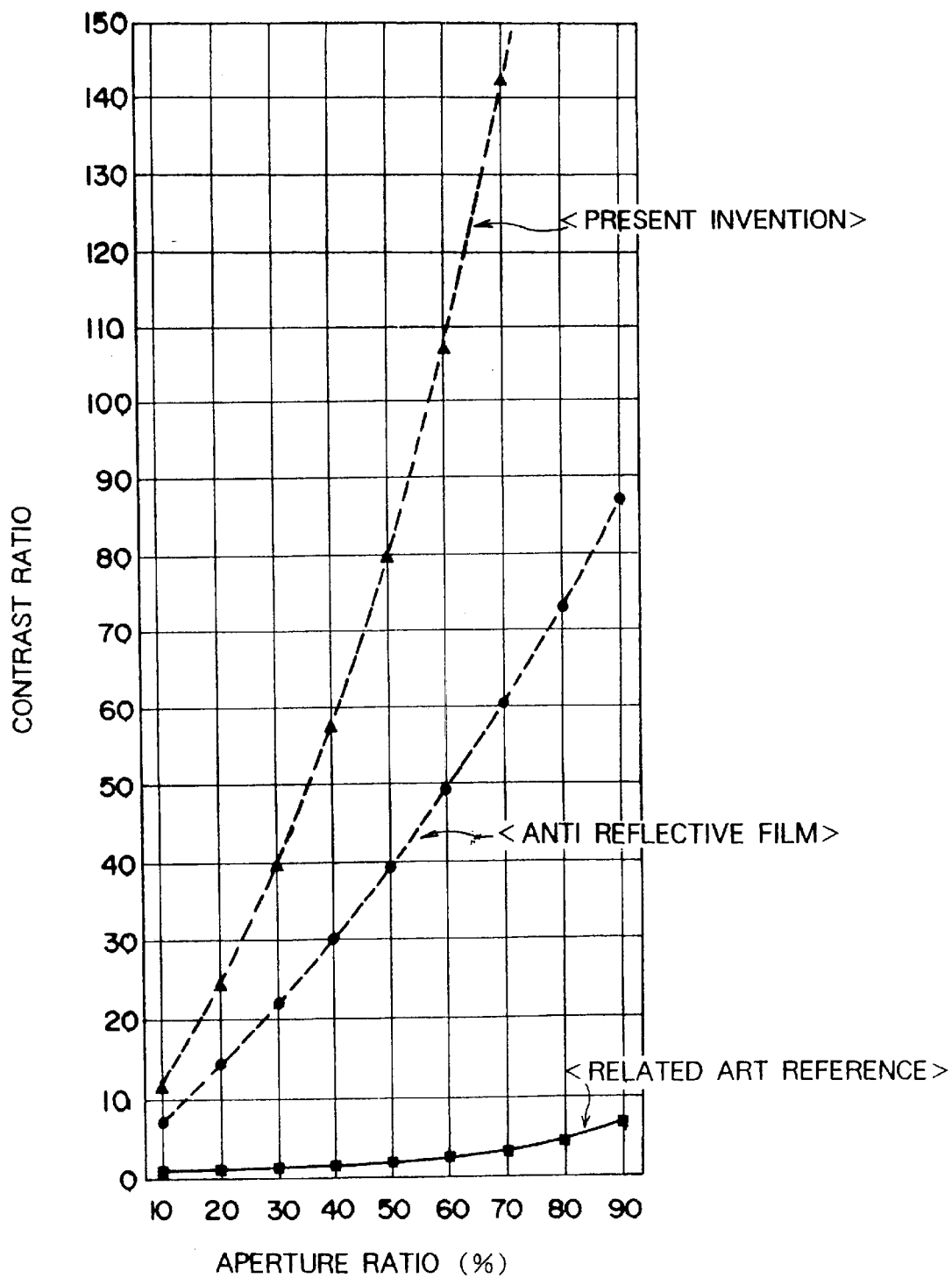
FIG. 18 is a graph of the comparison of contrast ratios of the reflection type liquid crystal projector according to the present invention and a conventional reflection type liquid crystal projector.

FIG. 18 is a graph showing experimental results of projected images of the reflection type liquid crystal projector according to the this embodiment and conventional reflection type liquid crystal projector. Referring to FIG. 18, the contrast ratio of the reflection type liquid crystal projector according to the this embodiment is 100:1 that is remarkably improved than that of the conventional reflection type liquid crystal projector. In addition, the contrast ratio of the reflection type liquid crystal projector according to this embodiment is twice or more times improved than that of a conventional reflection type liquid crystal projector using a reflection protecting film.

As described in the twelfth embodiment of the present invention, according to the present invention, a reflection type liquid crystal projector including reflection type liquid crystal display devices that separate light displayed as an image from undesired light reflected on the front surface of the liquid crystal display panel and prevents luminance characteristics and a contrast ratio from deteriorating due to the reflected light can be provided so as to display an image with a high contrast ratio.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A reflection type liquid crystal display apparatus, comprising:

a plurality of scanning lines and a plurality of signal lines that are intersected with each other and that are disposed on a flat base member;

a switching device connected to the scanning lines and the signal lines and controlled by scanning voltages of an image signal voltage applied from the scanning lines;

a switching device array substrate having a pixel electrode connected to the switching device and to which the image signal voltage is applied and that is adapted for reflecting incident light;

an opposite substrate having an opposite electrode disposed opposite to said switching device array substrate with a space on a base member; and a liquid crystal layer disposed in the space between said switching device array substrate and said opposite substrate, the periphery of said switching device array substrate and said opposite substrate being sealed, wherein said pixel electrode includes a first pixel electrode layer which has a reflecting main surface inclined to said opposite substrate and a second pixel electrode layer disposed on the main surface of the first pixel electrode layer, and the second pixel electrode layer being made of transparent material and has a main surface which is opposite to an opposite surface and is in parallel with said opposite substrate.

2. A reflection type liquid crystal display apparatus as set forth in claim 1, wherein said opposite substrate and the pixel electrode are disposed so that an incident light has an inclination angle to the normal of said opposite substrate and to the normal of the pixel electrode.

3. A reflection type liquid crystal display apparatus as set forth in claim 1, wherein said liquid crystal layer is one kind of scattering mode type, including polymer dispersed type liquid crystal layer, being able to change into a light scattering state or a light passing state.

4. A reflection type liquid crystal display apparatus as set forth in claim 1, wherein the transparent material is ITO.

5. A reflection type liquid crystal display apparatus as set forth in claim 1, wherein an angle between the opposite substrate and the inclined reflecting main surface of the first pixel electrode is in a range of 3 to 8°.

6. A reflection type liquid crystal display apparatus as set forth in claim 1, wherein the display apparatus is adapted for a projection type display.

* * * * *